(12) United States Patent
Kawaguchi et al.

(10) Patent No.: US 12,519,940 B2
(45) Date of Patent: *Jan. 6, 2026

(54) IMAGE CODING APPARATUS, IMAGE CODING METHOD, AND PROGRAM, AND IMAGE DECODING APPARATUS, IMAGE DECODING METHOD, AND PROGRAM

(71) Applicant: CANON KABUSHIKI KAISHA, Tokyo (JP)

(72) Inventors: Osamu Kawaguchi, Kanagawa (JP); Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/773,236

(22) Filed: Jul. 15, 2024

(65) Prior Publication Data
US 2024/0373007 A1 Nov. 7, 2024

Related U.S. Application Data

(63) Continuation of application No. 18/048,351, filed on Oct. 20, 2022, now Pat. No. 12,069,259, which is a continuation of application No. 17/132,678, filed on Dec. 23, 2020, now Pat. No. 11,523,113, which is a continuation of application No. PCT/JP2019/023715, filed on Jun. 14, 2019.

(30) Foreign Application Priority Data

Jun. 27, 2018 (JP) ................... 2018-122421

(51) Int. Cl.
| | | |
|---|---|---|
| H04N 19/119 | (2014.01) | |
| H04N 19/117 | (2014.01) | |
| H04N 19/169 | (2014.01) | |
| H04N 19/176 | (2014.01) | |
| H04N 19/82 | (2014.01) | |

(52) U.S. Cl.
CPC ......... *H04N 19/119* (2014.11); *H04N 19/117* (2014.11); *H04N 19/176* (2014.11); *H04N 19/1883* (2014.11); *H04N 19/82* (2014.11)

(58) Field of Classification Search
CPC .. H04N 19/119; H04N 19/117; H04N 19/176; H04N 19/1883; H04N 19/82
See application file for complete search history.

(56) References Cited

U.S. PATENT DOCUMENTS 9,161,046 B2 * 10/2015 Van der Auwera .... H04N 19/14

FOREIGN PATENT DOCUMENTS

| CN | 103141106 A | 6/2013 | |
|---|---|---|---|
| CN | 103416057 A | 11/2013 | |
| WO | WO-2017206826 A1 * | 12/2017 | ............. H04N 19/70 |

* cited by examiner

*Primary Examiner* — Dave Czekaj
*Assistant Examiner* — Shanika M Brumfield
(74) *Attorney, Agent, or Firm* — Canon U.S.A., Inc. IP Division

(57) ABSTRACT

Control over encoding of a quantization parameter is appropriately enabled with not only square sub-blocks but also rectangular sub-blocks by using a quantization control size adaptively according to a shape of sub-blocks, with the result that coding efficiency is improved.

6 Claims, 27 Drawing Sheets

FIG. 10A
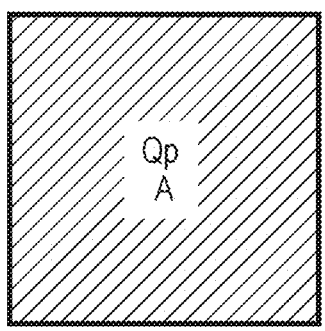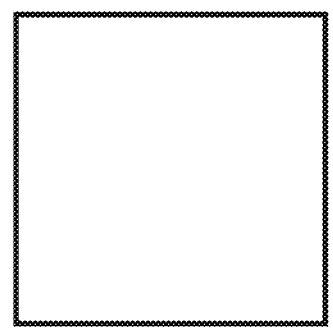
FIG. 10B
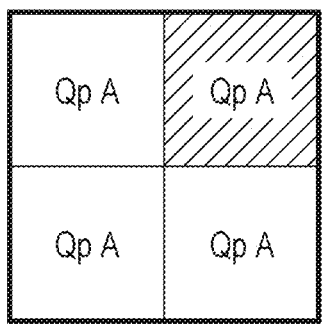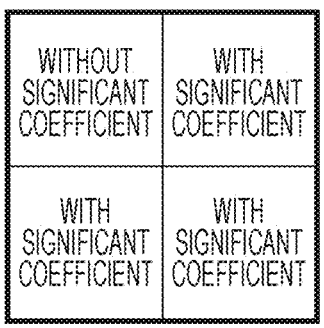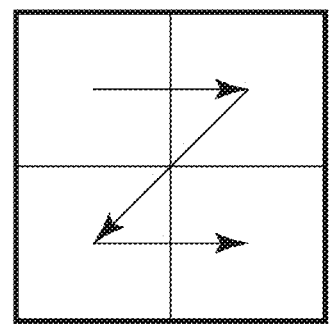
FIG. 10C
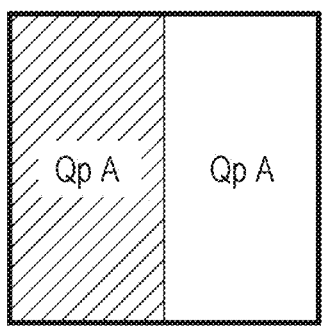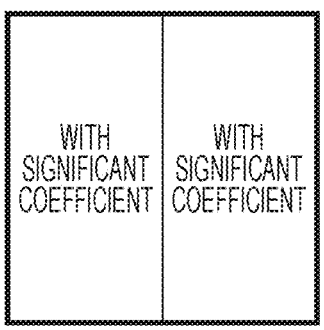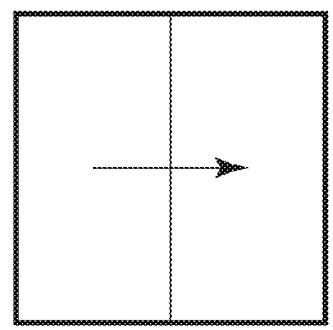

SPLIT CONDITION OF BLOCK     QUANTIZATION CONTROL SIZE

SPLIT CONDITION OF BLOCK     QUANTIZATION CONTROL SIZE

SPLIT CONDITION OF BLOCK     QUANTIZATION CONTROL SIZE

| D3 | D3 | D3 | | | D1 | |
|----|----|----|----|----|----|----|
| D3 | D3 | D3 | | | | |
| D2 | | D3 | | | | |
| | | D3 | | | | |
| | | D3 | | | | |
| D3 | D3 | | D4 | D4 D4 | D2 | |
| D3 | | | D3 D4 D4 | | | |
| D3 | | | D4 | D2 | D3 | |
| D3 | | | | | D3 | |

FIG. 15B

| Qp A | Qp B | QpE | |
|------|------|-----|---|
| Qp C | Qp D | | |
| Qp F | Qp G | Qp H | Qp I |
| | | Qp J | Qp K |

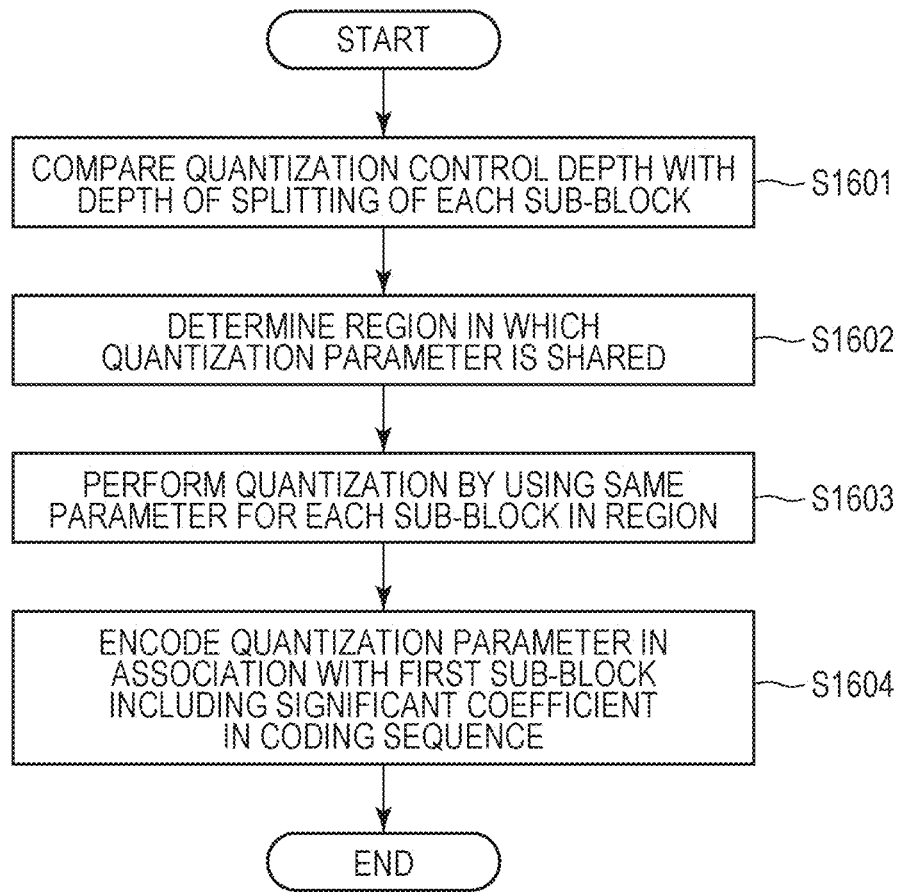

IMAGE CODING APPARATUS, IMAGE CODING METHOD, AND PROGRAM, AND IMAGE DECODING APPARATUS, IMAGE DECODING METHOD, AND PROGRAM

CROSS-REFERENCE TO RELATED APPLICATIONS

This application is a Continuation of U.S. patent application Ser. No. 18/048,351, filed on Oct. 20, 2022, which is a Continuation of U.S. patent application Ser. No. 17/132,678, filed on Dec. 23, 2020, and issued as U.S. Pat. No. 11,523,113 on Dec. 6, 2022, which is a Continuation of International Patent Application No. PCT/JP2019/023715, filed Jun. 14, 2019, which claims the benefit of Japanese Patent Application No. 2018-122421, filed Jun. 27, 2018, all of which are hereby incorporated by reference herein in their entirety.

TECHNICAL FIELD

The present invention relates to an image coding apparatus, an image coding method, and a program, and an image decoding apparatus, an image decoding method, and a program.

BACKGROUND ART

An HEVC (High Efficiency Video Coding) coding system (hereinafter, referred to as HEVC) is known as a coding system for compression recording of moving images. To improve coding efficiency, the HEVC adopts a basic block having a larger size than an existing macro block (16×16 pixels). A large-size basic block is called CTU (Coding Tree Unit), and its size is up to 64×64 pixels. A CTU is further split into sub-blocks that are units for prediction and transformation. Patent Literature 1 describes a technology for making it possible to change a coding unit for quantization parameters by calculating a sub-block size in which quantization parameters are encoded (hereinafter, referred to as quantization control size).

In recent years, activities for international standardization of a further high-efficiency coding system as a succeeding version of the HEVC have been started. A JVET (Joint Video Experts Team) has been established between ISO-IEC and ITU-T, and standardization has been proceeding as a VVC (Versatile Video Coding) coding system (hereinafter, VVC). To improve coding efficiency, in addition to an existing square subblock-based intra prediction and orthogonal transform method, a rectangular sub-block-based intra prediction and orthogonal transform method has been studied.

For the VVC, not only a square sub-block like the HEVC but also rectangular sub-block splitting has been studied. A quantization control size used as a reference to encode quantization parameters in the HEVC is set on the assumption of square sub-blocks. On the other hand, when rectangular sub-block splitting that has been being studied as the VVC is performed, there are cases where whether to encode quantization parameters cannot be uniquely determined. Therefore, the present invention is contemplated to solve the above-described problem, and it is an object of the present invention to make it possible to appropriately control encoding of a quantization parameters by using not only square sub-blocks but also rectangular sub-blocks.

CITATION LIST

Patent Literature

PTL 1: Japanese Patent Laid-Open No. 2012-161074

SUMMARY OF INVENTION

To solve the above-described problem, an image coding apparatus of the present invention has the following configuration. The image coding apparatus splits an image into a plurality of sub-blocks and encodes the image for each of the split sub-blocks, and includes coding means configured to, when, of the plurality of sub-blocks, a smaller one of a horizontal size and a vertical size of a target sub-block to be processed is greater than or equal to a quantization control size used as a sub-block size to encode a quantization parameter, encode a quantization parameter.

In addition, an image decoding apparatus of the present invention has the following configuration. The image decoding apparatus decodes an image, made up of a plurality of sub-blocks, for each of the sub-blocks, and includes, when, of the plurality of sub-blocks, a smaller one of a horizontal size and a vertical size of a target sub-block to be processed is greater than or equal to a quantization control size used as a sub-block size to decode a quantization parameter, decoding a quantization parameter.

Further features of the present invention will become apparent from the following description of exemplary embodiments with reference to the attached drawings.

BRIEF DESCRIPTION OF DRAWINGS

FIG. 10A is a view showing the relationship between coding of a quantization parameter and a significant coefficient in the embodiment.

FIG. 10B is a view showing the relationship between coding of quantization parameters and significant coefficients in the embodiment.

FIG. 10C is a view showing the relationship between coding of quantization parameters and significant coefficients in the embodiment.

FIG. 14D is a view showing comparison between a quantization control depth and a depth of a target sub-block in the embodiment.

FIG. 14E is a view showing comparison between a quantization control depth and a depth of a target sub-block in the embodiment.

FIG. 15A is a view showing that quantization parameters are read in a case where no significant coefficient is present in a quantization parameter share unit in the embodiment.

FIG. 15B is a view showing that quantization parameters are read in a case where no significant coefficient is present in a quantization parameter share unit in the embodiment.

FIG. 16 is a flowchart of a quantization parameter coding process using a quantization control depth.

DESCRIPTION OF EMBODIMENTS

Hereinafter, the present invention will be described in detail based on its suitable embodiment with reference to the attached drawings. The configuration that will be described in the following embodiment is just one example, and the present invention is not limited to the illustrated configuration.

Figure 1:
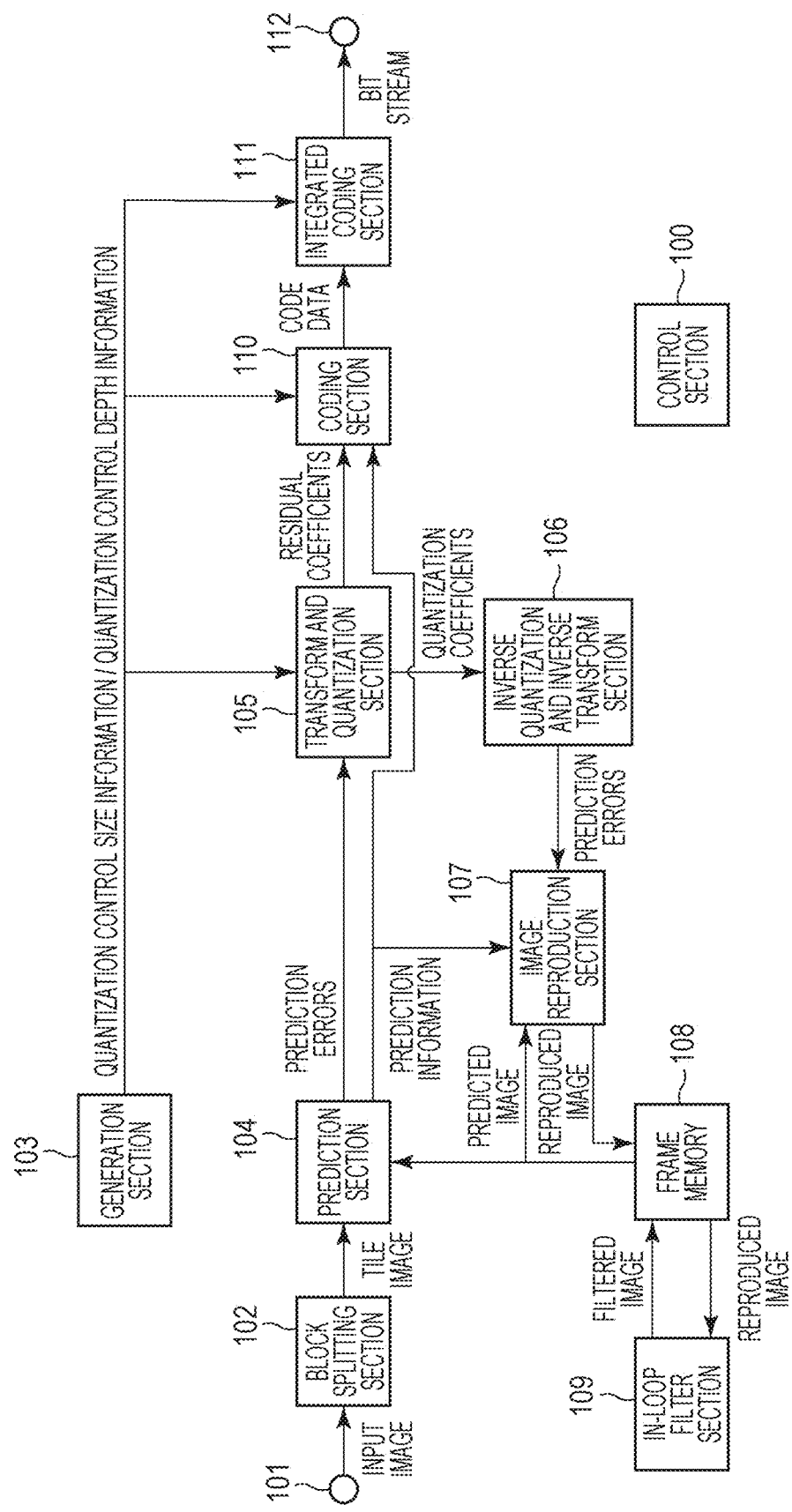
FIG. 1 is a block diagram showing the configuration of an image coding apparatus in an embodiment.

FIG. 1 is a block diagram showing an image coding apparatus of the present embodiment. In FIG. 1, a control section (a control unit) 100 is a processor that controls the overall image coding apparatus, and a terminal 101 is an input terminal for inputting image data.

A block splitting section (A block splitting unit) 102 splits an input image into a plurality of basic blocks and outputs the images in units of basic blocks to a subsequent stage.

A generation section (A generation unit) 103 generates, for example, information on a size used to encode quantization parameters (quantization control size) and outputs the information. A method of generating information on a quantization control size is not limited. A user may input a quantization control size, a quantization control size may be calculated from the characteristics of an input image, or a quantization control size designated in advance as an initial value may be used.

A prediction section (A prediction unit) 104 generates sub-blocks by splitting each basic block, performs intra prediction that is intra-frame prediction, inter prediction that is inter-frame prediction, and the like in units of sub-blocks and generates predicted image data. In addition, prediction errors are calculated from image data, indicating input pixel values, and the predicted image data, and are output. Information needed for prediction, for example, information on sub-block splitting, prediction mode, motion vector, and the like, is also output together with the prediction errors. Hereinafter, the information needed for prediction is referred to as prediction information.

A transform and quantization (A transform and quantization unit) section 105 performs orthogonal transformation of residuals representing prediction errors in units of sub-blocks, further performs quantization, and obtains residual coefficients representing the residuals. Quantization parameters are parameters used to perform quantization of transform coefficients obtained through orthogonal transformation.

An inverse quantization and inverse transform section (An inverse quantization and inverse transform unit) 106 reproduces transform coefficients by performing inverse quantization of residual coefficients output from the transform and quantization section 105 and reproduces prediction errors by applying inverse orthogonal transformation to the transform coefficients.

Frame memory 108 is memory that stores reproduced image data.

An image reproduction section (An image reproduction unit) 107 generates predicted image data by reading the frame memory 108 as needed using prediction information output from the prediction section 104, and generates reproduced image data from the predicted image data and input prediction errors.

An in-loop filter section (An in-loop filter unit) 109 applies in-loop filtering, such as deblocking filter and sample adaptive offset, to a reproduced image.

A coding section (A coding unit) 110 generates code data by encoding residual coefficients output from the transform and quantization section 105 and prediction information output from the prediction section 104.

An integrated coding section 111 generates header code data by encoding information on a quantization control size from the generation section 103. The integrated coding section 111 forms a bit stream by further combining the header code data with the code data output from the coding section 110. A terminal 112 is an output terminal for outputting, to the outside, the bit stream generated by the integrated coding section 111.

An image coding operation in the image coding apparatus will be described below. In the present embodiment, moving image data is input in units of frames. Alternatively, one-frame still image data may be input.

One-frame image data input from the terminal 101 is input to the block splitting section 102.

The block splitting section 102 splits the input image data into a plurality of basic blocks and outputs the images in units of basic blocks to the prediction section 104.

The prediction section 104 performs a prediction process on the image data input from the block splitting section 102. Specifically, the prediction section 104 initially determines sub-block splitting for splitting basic blocks into further smaller sub-blocks.

FIG. 7 shows examples of a type of splitting of a basic block. Thick frames indicated by 700 represent basic blocks. For the sake of easy illustration, it is assumed that the size of each basic block is configured as 32×32 pixels and rectangles in the thick frames represent sub-blocks. FIG. 7B shows an example of square sub-blocks obtained through splitting, and a 32×32 pixel basic block is split into 16×16 pixel sub-blocks. On the other hand, FIG. 7C to FIG. 7F show examples of types of rectangular sub-blocks obtained through splitting. In FIG. 7C, a basic block is split into 16×32 pixel, vertically-long rectangular sub-blocks. In FIG. 7D, a basic block is split into 32×16 pixel, horizontally-long sub-blocks. In FIG. 7E and FIG. 7F, a basic block is split into rectangular sub-blocks at a ratio of 1:2:1. In this way, in the present embodiment, a coding process is performed by using not only square sub-blocks but also rectangular sub-blocks. In the present embodiment, information on such a type of splitting of a basic block is encoded as split information. In addition, to obtain the hierarchical structure of sub-blocks as shown to the left side in FIG. 15 (described later), information on types of splitting is hierarchized and encoded.

The prediction section 104 determines a prediction mode for each sub-block to be processed. Specifically, the prediction section 104 determines a prediction mode in units of sub-blocks, such as intra prediction that uses encoded pixels in the same frame as a frame including each sub-block to be processed or inter prediction that uses pixels of another encoded frame. The prediction section 104 generates predicted image data from the determined prediction modes and the encoded pixels, further generates prediction errors from the input image data and the predicted image data, and outputs the prediction errors to the transform and quantization section 105. The prediction section 104 also outputs information on sub-block splitting, prediction modes, and the like to the coding section 110 and the image reproduction section 107 as prediction information.

Here, a transform process and a quantization process performed by the transform and quantization section 105 will be more specifically described. The transform and quantization section 105 applies frequency transformation to image data (pixel values) of sub-blocks on which the prediction process has been performed by the prediction section 104 and further performs quantization on the image data. FIG. 8A to FIG. 8F show the relationships between a type of splitting of a block and a quantization control size. The transform and quantization section 105 determines a unit of sub-blocks in which a quantization parameter is shared and encoded, by using target sub-block sizes and a quantization control size output from the generation section 103. In other words, in the subsequent coding section 110, whether a quantization parameter should be shared among a plurality of sub-blocks is determined in accordance with comparison between a quantization control size and the size of each sub-block. Encoding of quantization parameters will be described later. A method of determining the values in themselves of quantization parameters used for quantization is not limited. A user may input quantization parameters, quantization parameters may be calculated from the characteristics of an input image, or quantization parameters designated in advance as initial values may be used.

Next, a method of determining a unit in which a quantization parameter is encoded will be described.

The transform and quantization section 105 compares the length of a shorter one of a horizontal side and a vertical side of each target sub-block with a quantization control size and determines a unit in which a quantization parameter is encoded, that is, a unit in which the same quantization parameter is used.

FIG. 8 shows a unit in which a quantization parameter is encoded when the length of a shorter one of a horizontal side and a vertical side of each target sub-block is compared with a quantization control size. In FIG. 8, the length of one side of a square block is defined as a quantization control size. Specifically, FIG. 8 shows examples in which 16 is applied as a quantization control size. FIG. 8 indicates a shorter one of a horizontal length and a vertical length of each target sub-block with an arrow. Thick-frame rectangles of target sub-blocks in FIG. 8 represent regions in which a quantization parameter determined as a result of comparison between each target sub-block and the quantization control size is shared. Qp denotes a quantization parameter. For FIG. 8A, FIG. 8B, FIG. 8C, and FIG. 8D, a shorter one of a horizontal length and a vertical length of each target sub-block is larger than or equal to the quantization control size (16). For this reason, quantization of each target sub-block is performed by using a corresponding one of individual quantization parameters (QpA to QpD). A corresponding one of the quantization parameters (QpA to QpD) is encoded for each sub-block. On the other hand, for FIG. 8E and FIG. 8F, sub-blocks of which the length of a shorter one of a horizontal side and a vertical side is smaller than the quantization control size are included in a basic block to be processed, so a quantization parameter is shared among the plurality of sub-blocks. Specifically, for each of FIG. 8E and FIG. 8F, quantization of three sub-blocks is performed by using the same quantization parameter. At this time, for a quantization parameter to be encoded, one quantization parameter is encoded not for each sub-block but as a common quantization parameter. As described above, a quantization parameter is used in accordance with the size of each target sub-block and a quantization control size.

Next, examples of a case of a quantization control size different from that of FIG. 8 will be described with reference to FIG. 9. In FIG. 9 as well, the length of one side of a square block is defined as a quantization control size. Specifically, FIG. 9 shows examples in which the same length 32 as that of one side of a basic block to be processed is applied as a quantization control size. The meanings of thick frames, arrows, and Qp in FIG. 9 are similar to those of FIG. 8, so the description is omitted. In FIG. 9A to FIG. 9F, when a shorter one of a horizontal length and a vertical length of each target sub-block is compared with the quantization control size, any of the target sub-blocks is equal to or smaller than the quantization control size. For this reason, in each case, quantization of the sub-blocks is performed by using the same quantization parameter. For a quantization parameter to be encoded, a quantization parameter is encoded not for each sub-block but as a common quantization parameter.

Referring back to FIG. 1, the inverse quantization and inverse transform section 106 reproduces transform coefficients by performing inverse quantization of input residual coefficients, further reproduces prediction errors by applying inverse orthogonal transformation to the reproduced transform coefficients, and outputs the prediction errors to the image reproduction section 107. In an inverse quantization process on each sub-block, the same quantization parameter as that used in the transform and quantization section 105 is used.

The image reproduction section 107 reproduces a predicted image by reading the frame memory 108 as needed using prediction information input from the prediction section 104. The image reproduction section 107 reproduces image data from the reproduced predicted image and the reproduced prediction errors input from the inverse quantization and inverse transform section 106, inputs the image data to the frame memory 108, and stores the image data.

The in-loop filter section 109 reads out a reproduced image from the frame memory 108 and applies in-loop filtering, such as deblocking filter, to the reproduced image. In-loop filtering is performed in accordance with the prediction modes of the prediction section 104, the values of quantization parameters used in the transform and quantization section 105, and whether there is a non-zero value (hereinafter, significant coefficient) in each of processed sub-blocks after quantization, or sub-block split information. The in-loop filter section 109 inputs the filtered image to the frame memory 108 again and stores the image again.

The coding section 110 performs entropy coding on residual coefficients generated by the transform and quantization section 105, and prediction information input from the prediction section 104 and generates code data in units of blocks.

A method of entropy coding is not specified. Golomb coding, arithmetic coding, Huffman coding, or the like may be used. Generated code data is output to the integrated coding section 111. In encoding quantization parameters that make up quantization information, an identifier indicating a differential value between a quantization parameter of a sub-block to be encoded and a quantization parameter of a sub-block encoded before that sub-block is encoded. In the present embodiment, a differential value between a quantization parameter encoded just before that sub-block in a coding sequence as a predicted value and a quantization parameter of that sub-block is calculated; however, the predicted value of a quantization parameter is not limited thereto. A quantization parameter of a sub-block adjacent to the left or right of that sub-block may be used as a predicted value, or a value calculated from quantization parameters of a plurality of sub-blocks, such as a mean value, may be used as a predicted value.

Figure 10D:
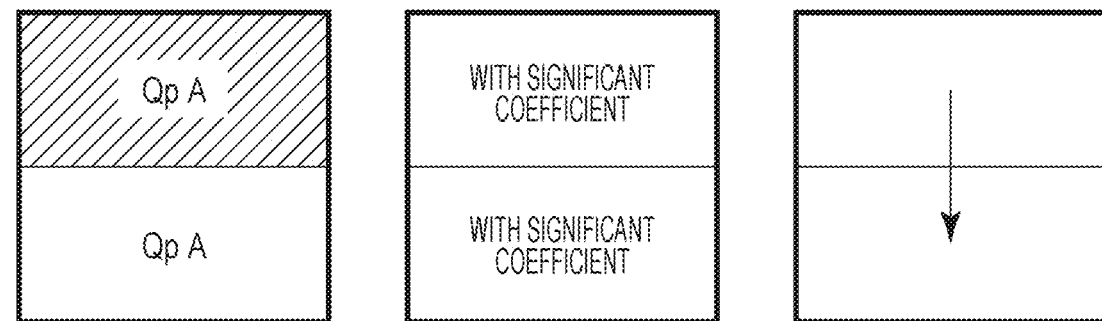
FIG. 10D is a view showing the relationship between coding of quantization parameters and significant coefficients in the embodiment.
Figure 10E:
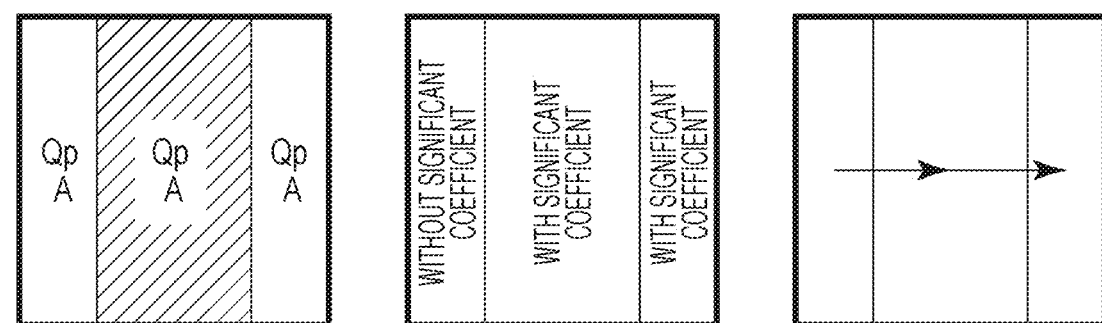
FIG. 10E is a view showing the relationship between coding of quantization parameters and significant coefficients in the embodiment.
Figure 10F:
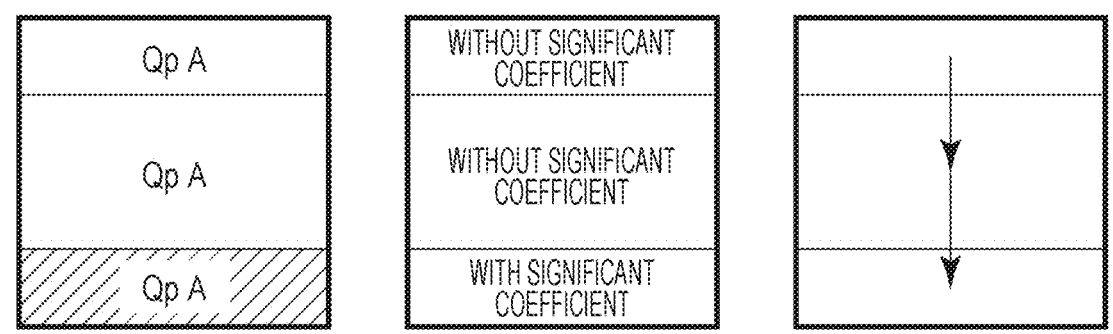
FIG. 10F is a view showing the relationship between coding of quantization parameters and significant coefficients in the embodiment.
Figure 11A:
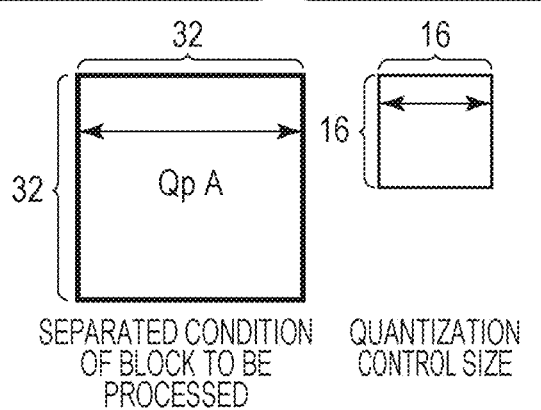
FIG. 11A is a view showing comparison between a quantization control size and a longer one of a horizontal size and a vertical size of a target sub-block in the embodiment.
Figure 11B:
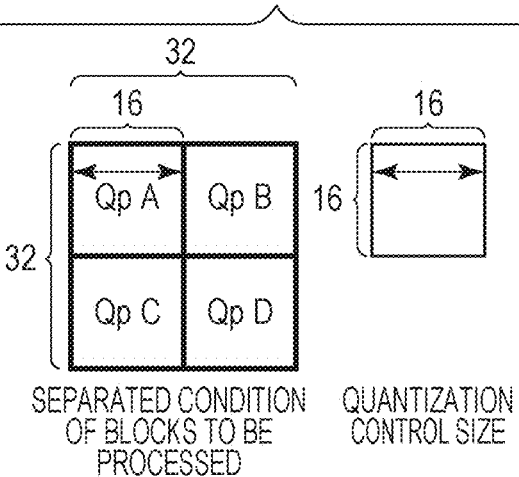
FIG. 11B is a view showing comparison between a quantization control size and a longer one of a horizontal size and a vertical size of a target sub-block in the embodiment.
Figure 11C:
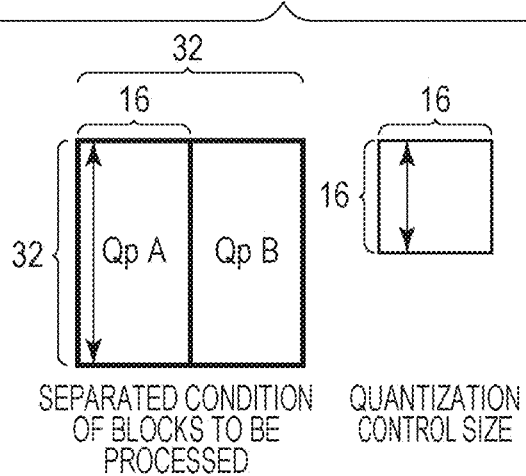
FIG. 11C is a view showing comparison between a quantization control size and a longer one of a horizontal size and a vertical size of a target sub-block in the embodiment.
Figure 11D:
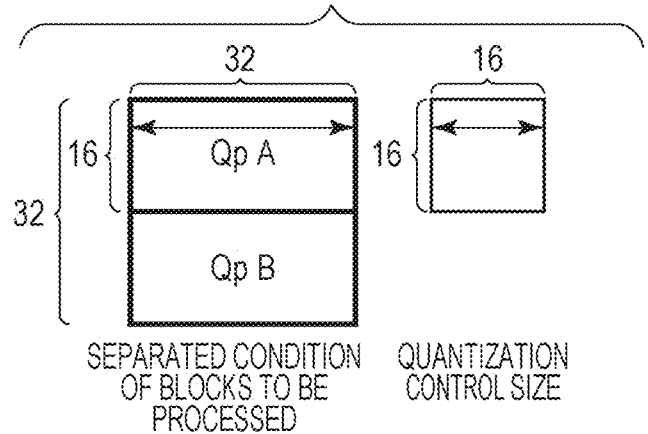
FIG. 11D is a view showing comparison between a quantization control size and a longer one of a horizontal size and a vertical size of a target sub-block in the embodiment.
Figure 11E:
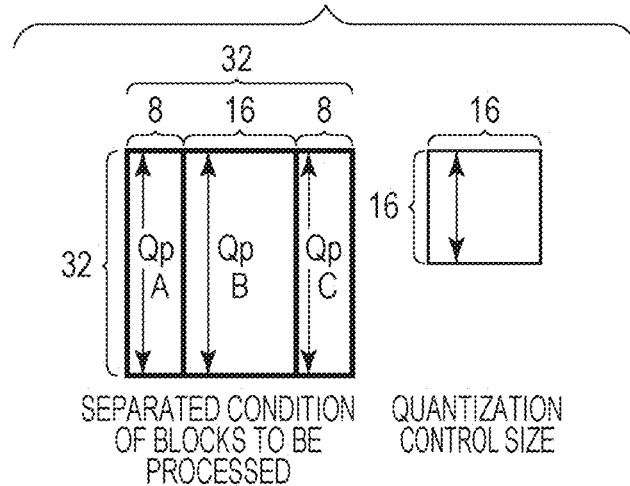
FIG. 11E is a view showing comparison between a quantization control size and a longer one of a horizontal size and a vertical size of a target sub-block in the embodiment.
Figure 11F:
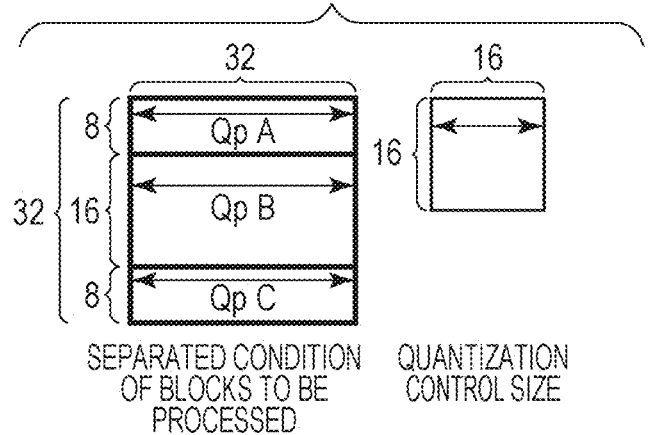
FIG. 11F is a view showing comparison between a quantization control size and a longer one of a horizontal size and a vertical size of a target sub-block in the embodiment.
Figure 12A:
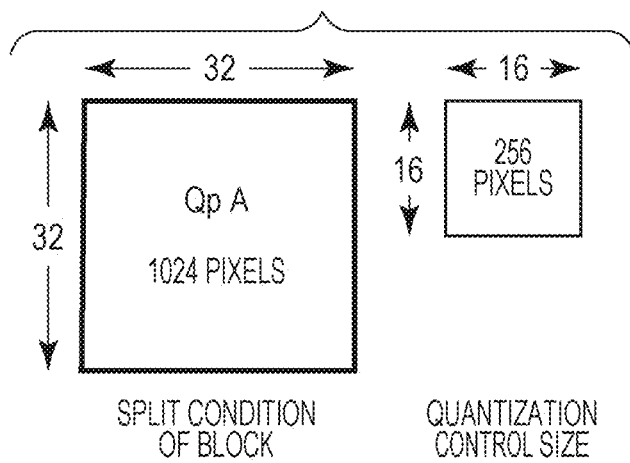
FIG. 12A is a view showing comparison between a pixel count of a quantization control size and a pixel count of a target sub-block in the embodiment and the embodiment.
Figure 12B:
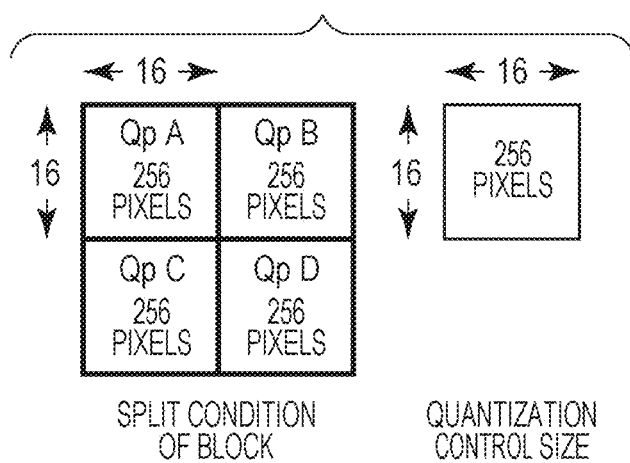
FIG. 12B is a view showing comparison between a pixel count of a quantization control size and a pixel count of a target sub-block in the embodiment and the embodiment.
Figure 12C:
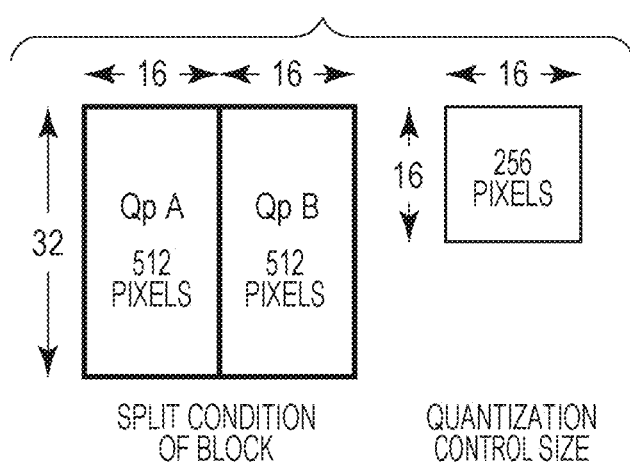
FIG. 12C is a view showing comparison between a pixel count of a quantization control size and a pixel count of a target sub-block in the embodiment and the embodiment.
Figure 12D:
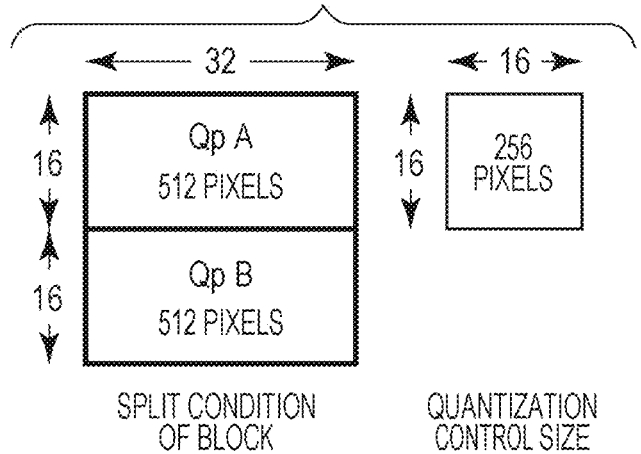
FIG. 12D is a view showing comparison between a pixel count of a quantization control size and a pixel count of a target sub-block in the embodiment and the embodiment.
Figure 12E:
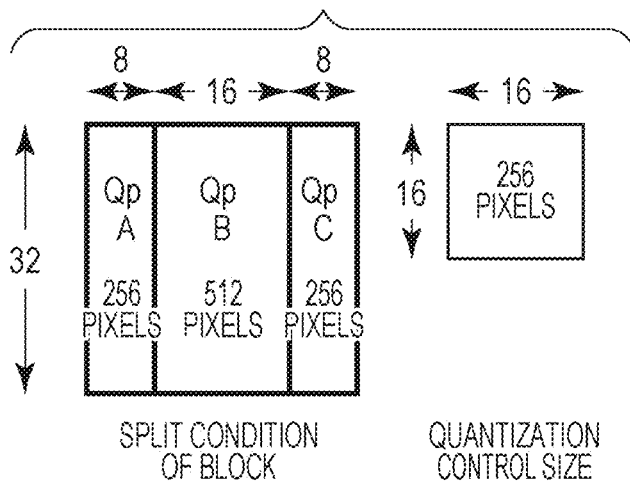
FIG. 12E is a view showing comparison between a pixel count of a quantization control size and a pixel count of a target sub-block in the embodiment and the embodiment.
Figure 12F:
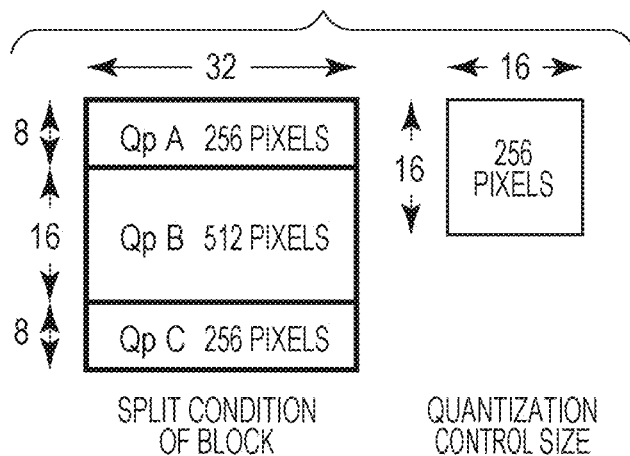
FIG. 12F is a view showing comparison between a pixel count of a quantization control size and a pixel count of a target sub-block in the embodiment and the embodiment.

Here, a process of encoding quantization parameters in accordance with a quantization control size will be further described with reference to FIG. 10. The left-side view in each of FIG. 10A to FIG. 10F shows a block splitting type and a quantization parameter (Qp) used in each sub-block. A diagonally-shaded sub-block represents a sub-block associated with a quantization parameter to be encoded. A thick-frame rectangle represents a region in which a quantization parameter determined in accordance with a quantization control size and each target sub-block size is shared. The middle view of each of FIG. 10A to FIG. 10F indicates whether each sub-block has a significant coefficient. A significant coefficient means a non-zero coefficient among residual coefficients after transform and quantization. In other words, having a significant coefficient means that at least one non-zero residual coefficient is present in a sub-block after transform and quantization. The arrow shown in the right-side view in each of FIG. 10A to FIG. 10F indicates a sequence of coding (decoding). In the present embodiment, in a region in which a quantization parameter is shared, the quantization parameter is associated with a first sub-block including a significant coefficient in the coding sequence and encoded. For example, in FIG. 10B, a first sub-block including a significant coefficient in the coding sequence is a top-right sub-block, so a quantization parameter associated with the sub-block is encoded. In this case, since a quantization parameter has been already encoded in the top-right sub-block in the quantization parameter coding unit, so a quantization parameter is not encoded in the bottom-left and bottom-right sub-blocks. On the other hand, in a quantization and inverse quantization process in the bottom-left and the bottom-right sub-blocks, QpA that is the same quantization parameter as that of the top-right sub-block is used. Furthermore, no significant coefficient is present in the top-left sub-block, so a quantization process is not performed; however, QpA that is the same quantization parameter as that of the top-right sub-block is used in a process using a quantization parameter, such as deblocking filter. In FIG. 10F, a first sub-block including a significant coefficient in the coding sequence is a sub-block located at the bottom side, so a quantization parameter is associated with the sub-block and encoded, and a quantization parameter is not encoded for the top and middle sub-blocks. However, in the top and middle sub-blocks in FIG. 10F, as well as the top-left sub-block in FIG. 10B, QpA that is the same quantization parameter as that of the bottom sub-block is used in a process using a quantization parameter, such as deblocking filter.

In this way, in sub-blocks in a region in which a quantization parameter determined in accordance with a quantization control size is shared, the quantization parameter is associated with a first sub-block including a significant coefficient in the coding sequence and encoded.

In the integrated coding section 111, information on a quantization control size is encoded. A method of coding is not specified. Golomb coding, arithmetic coding, Huffman coding, or the like may be used. A bit stream is formed by multiplexing these codes, code data input from the coding section 110, and the like. Eventually, the bit stream is output to the outside from the terminal 112.

Figure 6A:
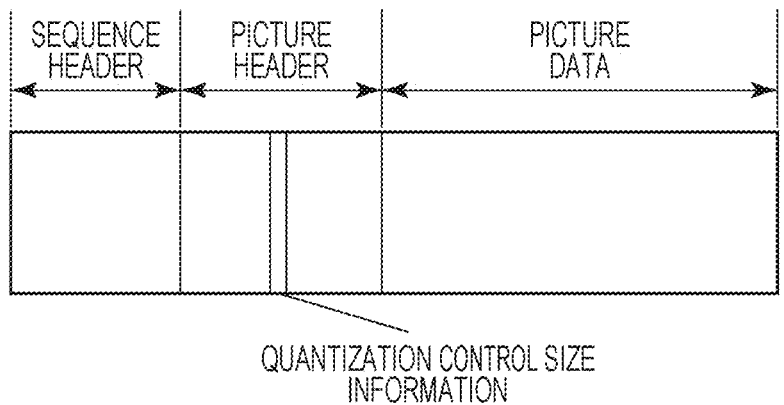
FIG. 6A is a view showing an example of a bit stream structure.
Figure 6B:
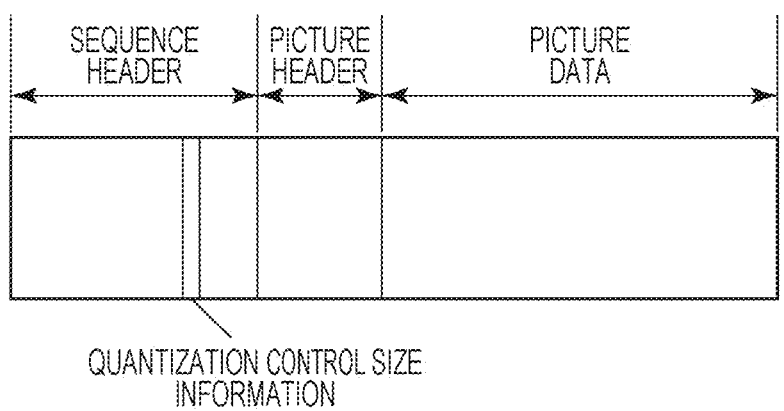
FIG. 6B is a view showing an example of a bit stream structure.
Figure 7A:
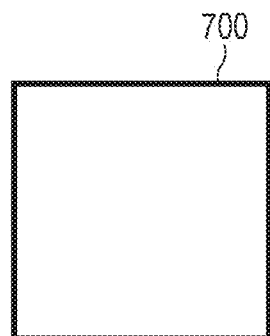
FIG. 7A is a view showing an example of sub-block splitting used in the embodiment.
Figure 7B:
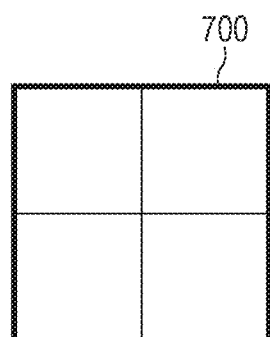
FIG. 7B is a view showing an example of sub-block splitting used in the embodiment.
Figure 7C:
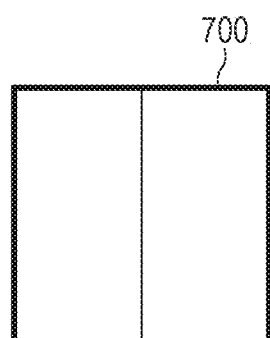
FIG. 7C is a view showing an example of sub-block splitting used in the embodiment.
Figure 7D:
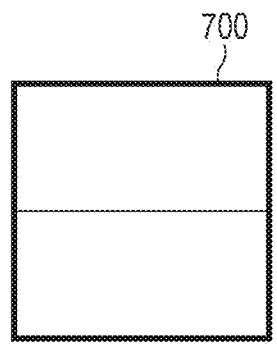
FIG. 7D is a view showing an example of sub-block splitting used in the embodiment.
Figure 7E:
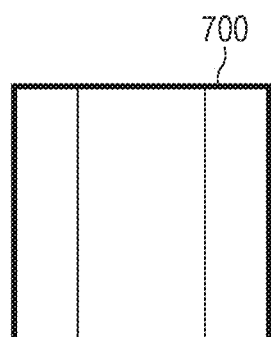
FIG. 7E is a view showing an example of sub-block splitting used in the embodiment.
Figure 7F:
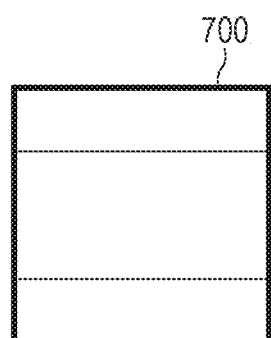
FIG. 7F is a view showing an example of sub-block splitting used in the embodiment.
Figure 8A:
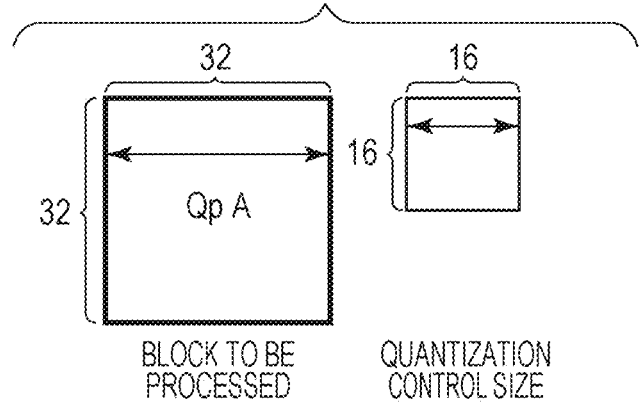
FIG. 8A is a view showing comparison between a quantization control size and a shorter one of a horizontal size and a vertical size of a target sub-block in the embodiment.
Figure 8B:
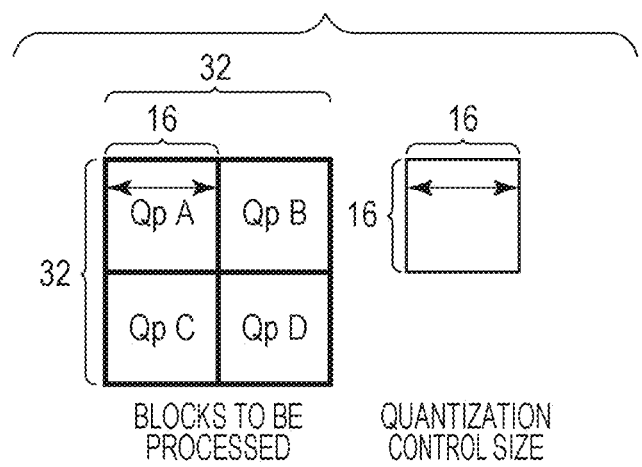
FIG. 8B is a view showing comparison between a quantization control size and a shorter one of a horizontal size and a vertical size of a target sub-block in the embodiment.
Figure 8C:
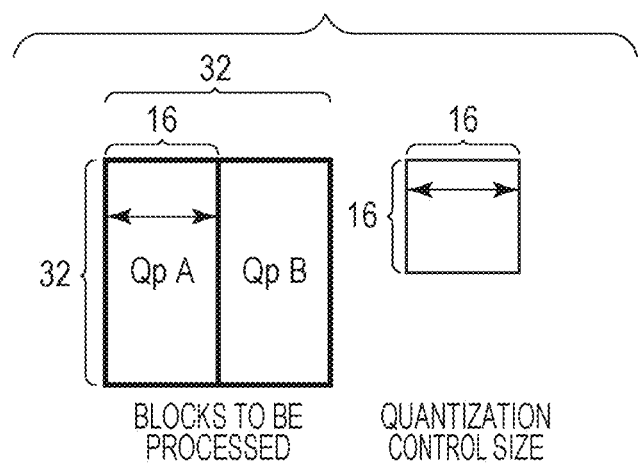
FIG. 8C is a view showing comparison between a quantization control size and a shorter one of a horizontal size and a vertical size of a target sub-block in the embodiment.
Figure 8D:
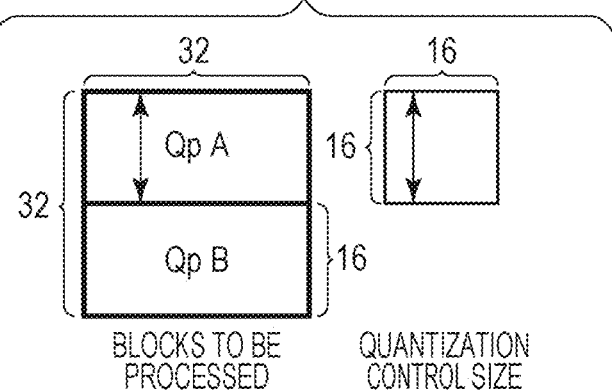
FIG. 8D is a view showing comparison between a quantization control size and a shorter one of a horizontal size and a vertical size of a target sub-block in the embodiment.
Figure 8E:
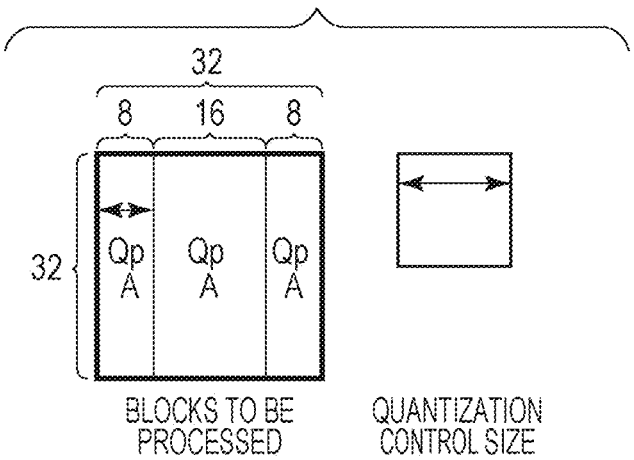
FIG. 8E is a view showing comparison between a quantization control size and a shorter one of a horizontal size and a vertical size of a target sub-block in the embodiment.
Figure 8F:
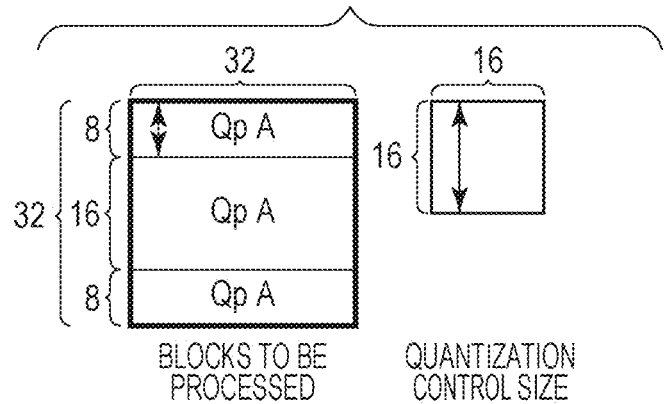
FIG. 8F is a view showing comparison between a quantization control size and a shorter one of a horizontal size and a vertical size of a target sub-block in the embodiment.
Figure 9A:
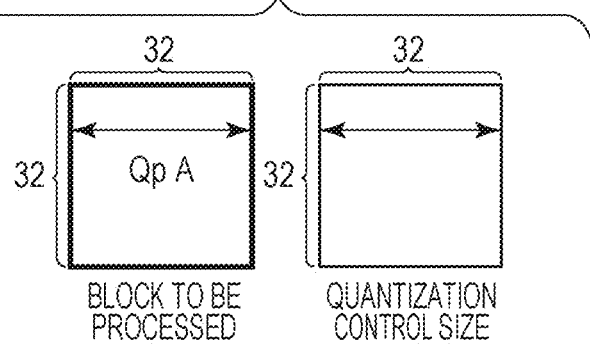
FIG. 9A is a view showing comparison between a quantization control size and a shorter one of a horizontal size and a vertical size of a target sub-block in the embodiment.
Figure 9B:
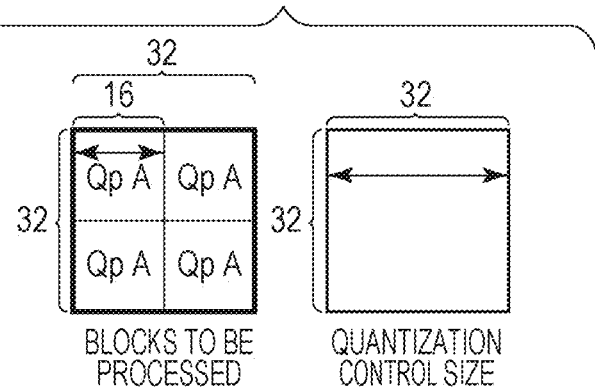
FIG. 9B is a view showing comparison between a quantization control size and a shorter one of a horizontal size and a vertical size of a target sub-block in the embodiment.
Figure 9C:
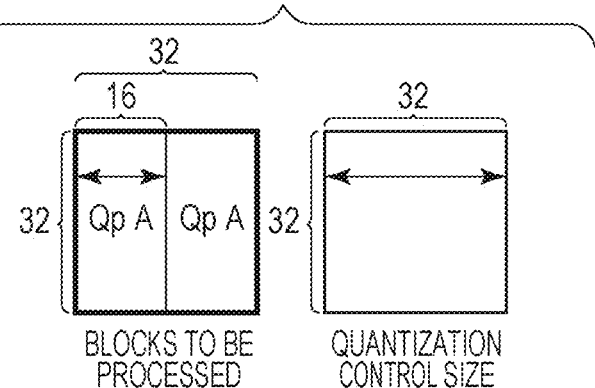
FIG. 9C is a view showing comparison between a quantization control size and a shorter one of a horizontal size and a vertical size of a target sub-block in the embodiment.
Figure 9D:
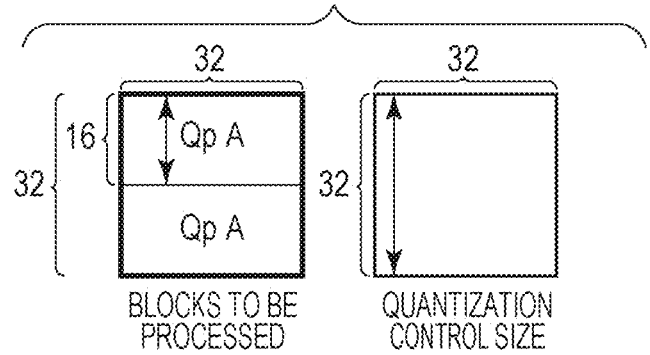
FIG. 9D is a view showing comparison between a quantization control size and a shorter one of a horizontal size and a vertical size of a target sub-block in the embodiment.
Figure 9E:
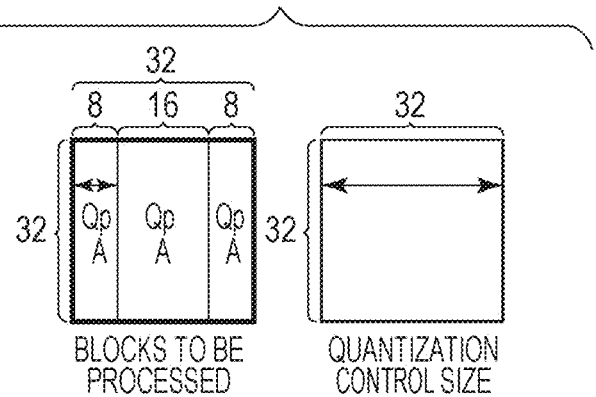
FIG. 9E is a view showing comparison between a quantization control size and a shorter one of a horizontal size and a vertical size of a target sub-block in the embodiment.
Figure 9F:
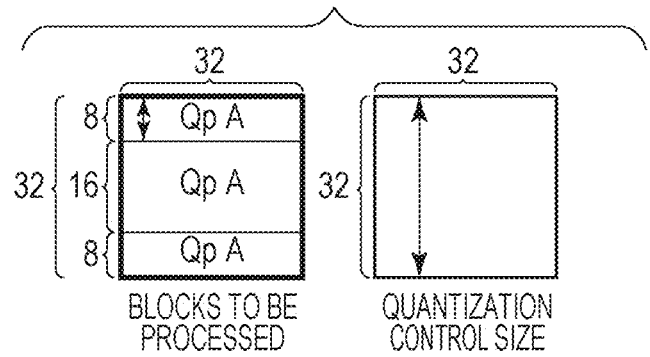
FIG. 9F is a view showing comparison between a quantization control size and a shorter one of a horizontal size and a vertical size of a target sub-block in the embodiment.

FIG. 6A shows an example of a bit stream including encoded information on a quantization control size. Information on a quantization control size is included in any one of headers of a sequence, a picture, and the like. In the present embodiment, it is assumed that, as shown in FIG. 6A, information on a quantization control size is included in a header of a picture. However, a position to which information on a quantization control size is encoded is not limited thereto and may be included in a header of a sequence as shown in FIG. 6B.

Figure 3:
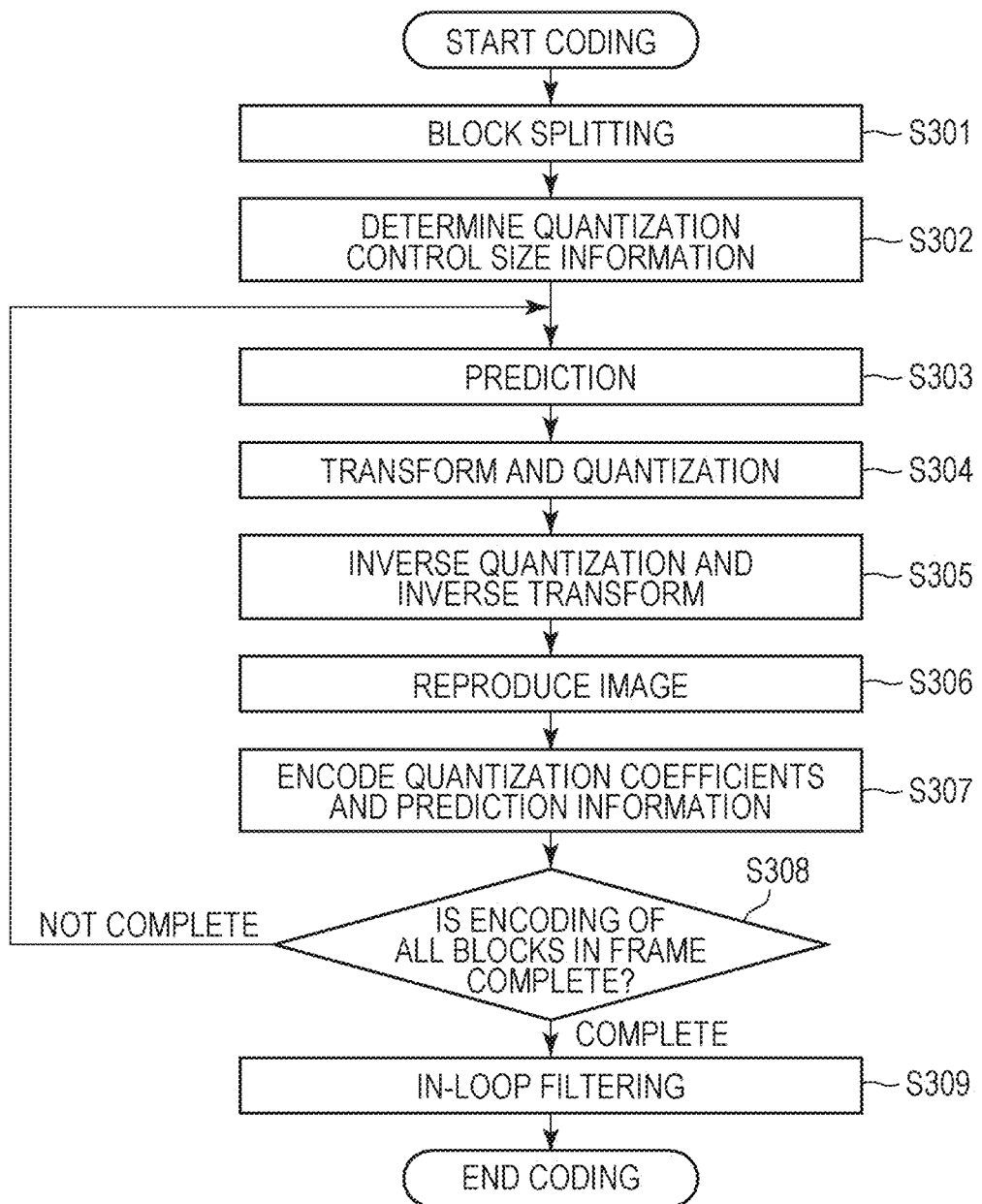
FIG. 3 is a flowchart showing an image coding process performed in the image coding apparatus according to the embodiment.

FIG. 3 is a flowchart showing a coding process performed in the image coding apparatus according to the present embodiment.

Initially, in step S301, the block splitting section 102 splits images input in units of frames into images in units of basic blocks.

In step S302, the generation section 103 determines a quantization control size that is a size for coding quantization parameters. Then, the information is set as quantization control size information. The quantization control size information is also encoded by the integrated coding section 111.

In step S303, the prediction section 104 generates sub-blocks by performing a splitting process on the image data generated in units of basic blocks in step S301. The prediction section 104 performs a prediction process on each of the generated sub-blocks and generates prediction information such as block splitting and prediction mode, and predicted image data. In addition, prediction errors are calculated from the input image data and the predicted image data.

In step S304, the transform and quantization section 105 generates transform coefficients by applying orthogonal transformation to the prediction errors calculated in step S303. The transform and quantization section 105 further generates residual coefficients by using quantization parameters determined in accordance with the quantization control size information generated in step S302. Specifically, as described above, whether a quantization parameter is shared among sub-blocks in a basic block is determined by making a comparison between the quantization control size information (for example, the length of one side of a square block) and the size (for example, the length of a short side or a long side) of each sub-block. In accordance with the determination, quantization of each of the sub-blocks in each region is performed by using the quantization parameter associated with the sub-blocks, and residual coefficients of each sub-block are generated.

In step S305, the inverse quantization and inverse transform section 106 reproduces prediction errors by applying inverse quantization and inverse orthogonal transformation to the residual coefficients generated in step S304. The same quantization parameters as those used in step S304 are used in the inverse quantization process in this step.

In step S306, the image reproduction section 107 reproduces a predicted image in accordance with the prediction information generated in step S303. The image reproduction section 107 further reproduces image data from the reproduced predicted image and the prediction errors generated in step S305.

In step S307, the coding section 110 encodes the prediction information generated in step S303 and the residual coefficients generated in step S304 together with the block split information, and generates code data. The coding section 110 also encodes the quantization parameters used in step S304 in accordance with the quantization control size information generated in step S302. The coding section 110 generates a bit stream by further incorporating other code data. Specifically, within each region in which the quantization parameter determined in step S304 is shared, the quantization parameter is encoded in association with a sub-block including at least one significant coefficient in the sequence of sub-blocks to be encoded.

In step S308, the control section 100 of the image coding apparatus determines whether encoding of all the basic blocks in the frame is complete, and, when encoding is complete, the process proceeds to step S309; otherwise, the process returns to step S303 for the next basic block.

In step S309, the in-loop filter section 109 applies in-loop filtering to the image data reproduced in step S306, generates the filtered image, and ends the process.

Thus, particularly, the quantization control size information is generated in step S302, and the quantization and coding process is performed in accordance with the quantization control size information in step S304 and step S307, so it is possible to appropriately enable a quantization parameter coding process. As a result, while the amount of data of a generated bit stream as a whole is suppressed, the quality of an encoded image is improved.

In the present embodiment, a region in which a quantization parameter is shared is determined by using a shorter one of a horizontal length and a vertical length of each target sub-block for comparison with a quantization control size; however, the present invention is not limited thereto. For example, as shown in FIG. 11A to FIG. 11F, a share unit of a quantization parameter may be determined by making a comparison with a longer one of a horizontal length and a vertical length of each target sub-block. In FIG. 11, the length of a long side of each sub-block is a target to be compared with the length (16) of one side of a square block as a quantization control size. In FIG. 11, since the long sides of all the sub-blocks are longer than the quantization control size (16), a quantization parameter is encoded for each of the sub-blocks. With this configuration, for rectangular sub-blocks, it is possible to generate a bit stream focusing on minute control over quantization parameters rather than reduction in the amount of code of quantization parameters.

Furthermore, as another embodiment, a region in which a quantization parameter is shared may be determined by comparing the pixel count of each target sub-block with the pixel count of a quantization control size. FIG. 12A to FIG. 12F show cases where the pixel count of each target sub-block is compared with the pixel count of a quantization control size. In FIG. 12, the quantization control size is 16×16 pixels, so the pixel count is 256. For target sub-blocks, the pixel count is greater than or equal to 256 pixels in all the sub-blocks in FIG. 12A to FIG. 12F. Thus, in the examples of FIG. 12, a quantization parameter is encoded in each of all the sub-blocks. With this configuration, regardless of the shape of each sub-block, it is possible to realize quantization parameter control based on a pixel count in each sub-block.

In the present embodiment, the description is made on the assumption that the quantization control size is one side of a square block. Alternatively, the quantization control size may be one side of a rectangular block. In this case, the width and height of a quantization control size may be designated. In this case, the vertical length and the horizontal length of each target sub-block may be respectively compared with the width and height of a quantization control size, and, when both or one of the lengths is larger than or equal to the quantization control size, a quantization parameter may be encoded for each sub-block. With this configuration, it is possible to realize different quantization parameter controls for vertically-long rectangular sub-blocks and horizontally-long rectangular sub-blocks. When a sub-block of which both lengths or one of the lengths is smaller than the quantization control size is present in a basic block to be processed, one quantization parameter to be shared among sub-blocks that satisfy the condition is encoded.

In the present embodiment, the unit in which a quantization parameter is encoded is defined by a spatial size; however, the configuration is not limited thereto. A depth of quantization control (hereinafter, quantization control depth) that indicates the number of times a basic block is split may be generated, and whether to encode a quantization parameter may be determined by comparing the quantization control depth with the depth of splitting of each target sub-block. In this case, instead of quantization control size information shown in FIG. 6, quantization control depth information is encoded.

Figure 13A:
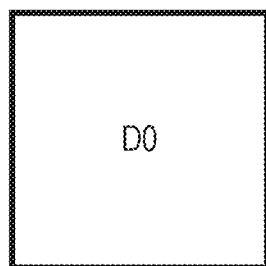
FIG. 13A is a view showing a depth of blocks in sub-block splitting, used in the embodiment.
Figure 13B:
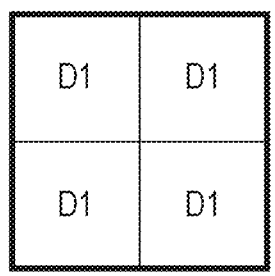
FIG. 13B is a view showing a depth of blocks in sub-block splitting, used in the embodiment.
Figure 13C:
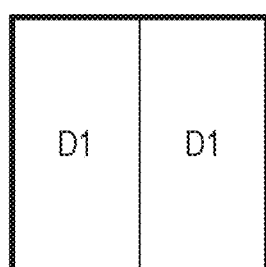
FIG. 13C is a view showing a depth of blocks in sub-block splitting, used in the embodiment.
Figure 13D:
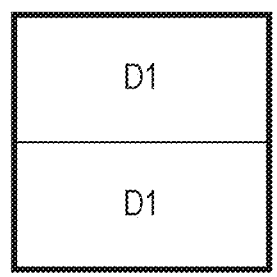
FIG. 13D is a view showing a depth of blocks in sub-block splitting, used in the embodiment.
Figure 13E:
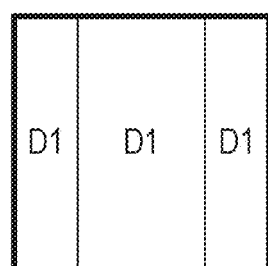
FIG. 13E is a view showing a depth of blocks in sub-block splitting, used in the embodiment.
Figure 13F:
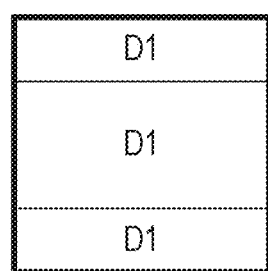
FIG. 13F is a view showing a depth of blocks in sub-block splitting used in the embodiment.

Here, the depth of splitting of each target sub-block will be described with reference to FIG. 13. In FIG. 13, D0 and D1 respectively indicate a depth of 0 and a depth of 1. FIG. 13A shows that a basic block has not been split once and the depth of the sub-block is 0 (D0). FIG. 13B shows that a basic block has been split in four and the depth of each sub-block is 1 (D1). FIG. 13C and FIG. 13D show that a basic block has been split in two and the depth of each sub-block is 1 (D1). FIG. 13E and FIG. 13F show that a basic block has been split in three and the depth of each sub-block is 1 (D1). In this way, the depth of each of sub-blocks into which a basic block has been split once increments one in any of four-section splitting, two-section splitting, and three-section splitting.

Figure 14A:
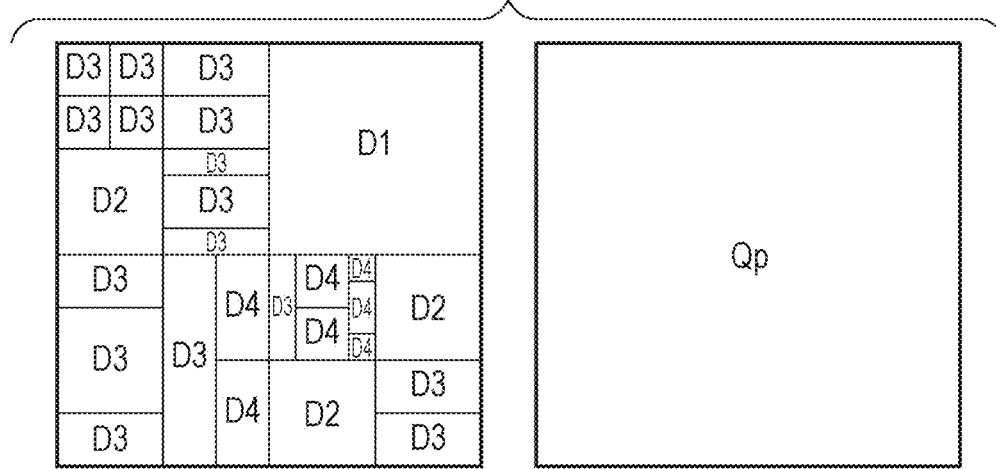
FIG. 14A is a view showing comparison between a quantization control depth and a depth of a target sub-block in the embodiment.
Figure 14B:
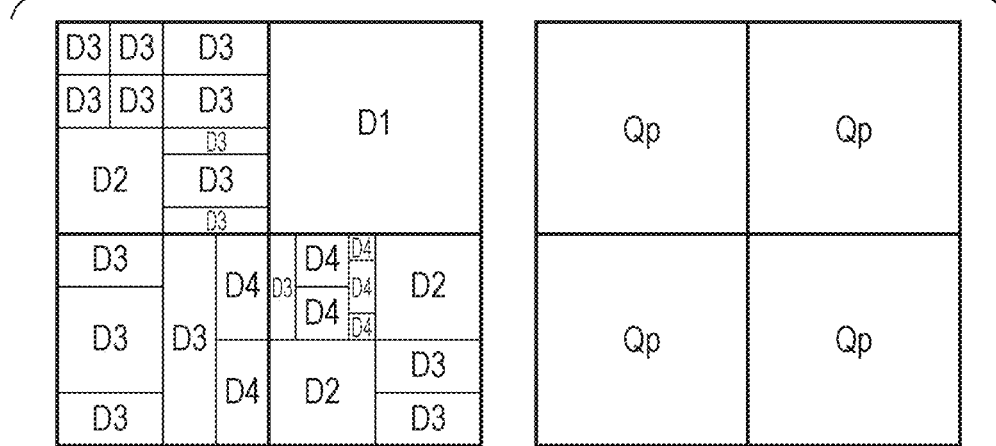
FIG. 14B is a view showing comparison between a quantization control depth and a depth of a target sub-block in the embodiment.
Figure 14C:
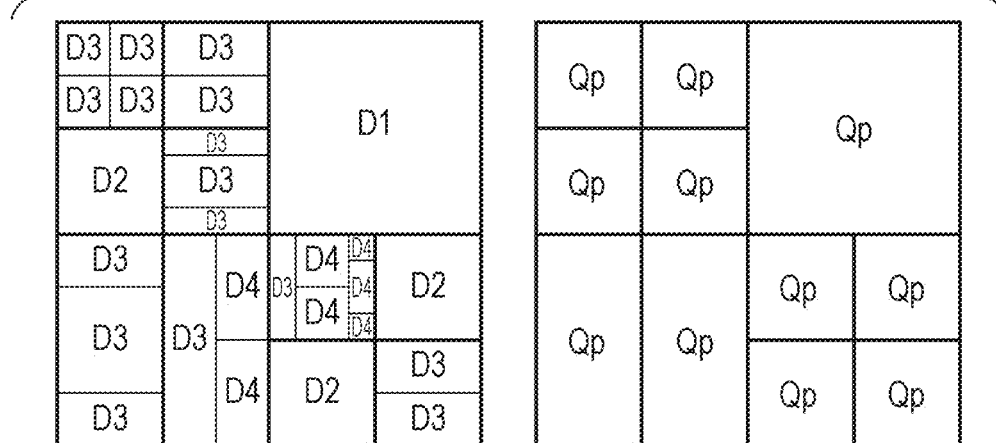
FIG. 14C is a view showing comparison between a quantization control depth and a depth of a target sub-block in the embodiment.
Figures 14D, 14E:
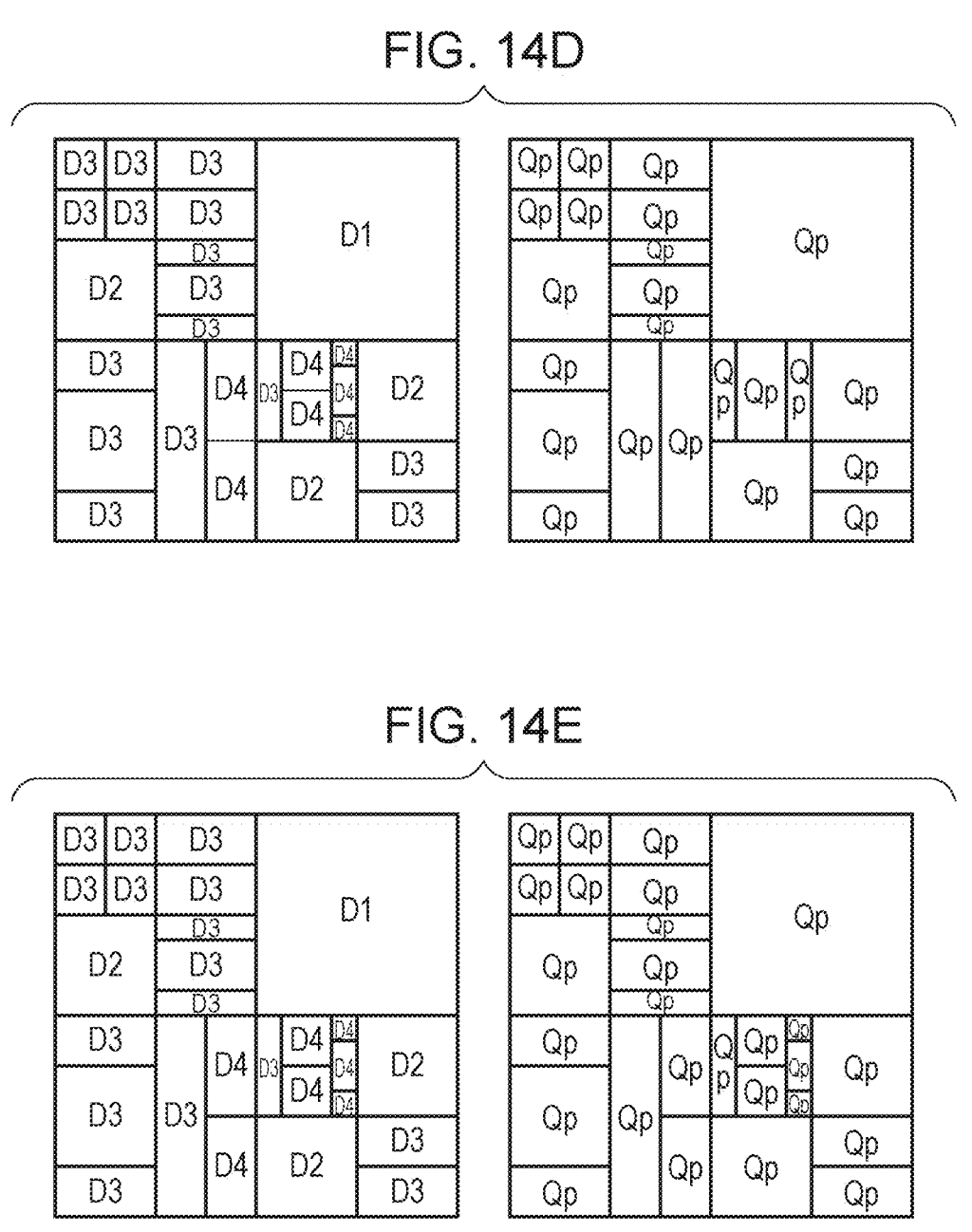

Next, how a quantization parameter is encoded in accordance with a quantization control depth and the depth of splitting of each target sub-block will be described with reference to FIG. 14. FIG. 14A to FIG. 14E show that the outermost square is a basic block. In each of FIG. 14A to FIG. 14E, the left side shows split sub-blocks, and the right side shows regions in each of which a quantization parameter is shared. D0, D1, D2, D3, or D4 in each block in the drawings indicates the depth of the sub-block. For example, D0 indicates a depth of 0, and D4 indicates a depth of 4. Qp denotes a quantization parameter. FIG. 14A, FIG. 14B, FIG. 14C, FIG. 14D, and FIG. 14E respectively show the cases where the quantization control depths are 0, 1, 2, 3, and 4. In the case of FIG. 14A, that is, when the quantization control depth is 0, a common quantization parameter is used for all the sub-blocks in the drawing, and the quantization parameter is encoded in association with a first sub-block including a significant coefficient in the coding sequence. In this case, the number of quantization parameters to be encoded is one. In the case of FIG. 14B, that is, when the quantization control depth is 1, a quantization parameter is shared in units of the blocks shown on the right side in FIG. 14B. In addition, one quantization parameter is encoded in association with a first sub-block including a significant coefficient in the coding sequence in the units of the blocks. In this case, the number of quantization parameters to be encoded is four. In the case of FIG. 14C, that is, when the quantization control depth is 2, a quantization parameter is shared in units of the blocks shown on the right side in the drawing, and one quantization parameter is encoded in association with a first sub-block including a significant coefficient in the coding sequence in the units. In this case, the number of quantization parameters to be encoded is 11. In the case of FIG. 14D, that is, when the quantization control depth is 3, a quantization parameter is shared in units of the blocks shown on the right side in FIG. 14D, and one quantization parameter is encoded in association with a first sub-block including a significant coefficient in the coding sequence in the units. In this case, the number of quantization parameters to be encoded is 23. In the case of FIG. 14E, that is, when the quantization control depth is 4, a quantization parameter is used in units of the blocks shown on the right side in FIG. 14D. In the case of FIG. 14E, the depth of splitting of blocks is equal to the quantization control depth, so a quantization parameter is encoded for each of the blocks. In this case, the number of quantization parameters to be encoded is 27.

Here, a case where a sub-block including no significant coefficient is present in a region in which a quantization parameter is shared will be described with reference to FIG. 15. FIG. 15A, as well as FIG. 14, shows sub-block splitting, and D0, D1, D2, D3, or D4 indicates the depth of each sub-block. FIG. 15B is an example showing quantization parameter sharing regions determined in accordance with the quantization control depth and the depth of each sub-block as in the case of FIG. 14. FIG. 15B shows the case where the quantization control depth is 2 as an example. FIG. 15B illustrates a case where no significant coefficient is present in all the three sub-blocks in a region associated with a quantization parameter of QpG as an example. In this case, the quantization parameter QpG for the three sub-blocks is not encoded. However, for processes such as deblocking filter, the same value as a quantization parameter encoded just before, that is, QpF, is used. In a quantization parameter coding unit in which no significant coefficient is present, a quantization parameter encoded just before in the coding sequence is used in processes using a quantization parameter; however, the present invention is not limited thereto. For example, QpD that is a quantization parameter of an upper adjacent quantization parameter coding unit may be used or QpF that is a left adjacent quantization parameter may be used. Alternatively, a value calculated from quantization parameters of a plurality of quantization parameter coding units, such as a mean value, may be used. Alternatively, an initial value of a quantization parameter for a slice may be used. A slice means a unit in which a frame is split, and is made up of at least one or more basic blocks. In this way, the depth of each target sub-block may be compared with a quantization control depth, and, when the depth of each target sub-block is less than or equal to the quantization control depth, a quantization parameter may be shared. Since sub-block split information is encoded each time of splitting, it is possible to realize quantization parameter coding control highly compatible with sub-block split information accordingly, with the result that the structure of syntax is simplified.

FIG. 16 is a flowchart showing a quantization parameter coding process using a quantization control depth.

In step S1601, the transform and quantization section 105 compares a quantization control depth with the depth of splitting of each sub-block.

In step S1602, the transform and quantization section 105 determines a region of sub-blocks having a depth of splitting greater than the quantization control depth as a result of comparison in S1601 as a region in which one quantization parameter is shared.

In step S1603, the transform and quantization section 105 performs quantization of the sub-blocks in the determined region by using the same quantization parameter.

In step S1604, the coding section 110 encodes the quantization parameter used in step S1603 in association with, of the sub-blocks in the determined region, a sub-block having at least one significant coefficient as a residual coefficient in the coding sequence. The integrated coding section 111 encodes the quantization control depth information.

The process of FIG. 16 is performed on each of basic blocks in a frame.

Furthermore, both a quantization control size and a quantization control depth may be generated and used in combination. In this case, in addition to quantization control size information shown in FIG. 6, quantization control depth information is encoded.

When, for example, the depth of each target sub-block is less than or equal to a quantization control depth and the length of a shorter one of a horizontal side and a vertical side of each target sub-block is larger than or equal to a quantization control size, a quantization parameter may be encoded for each sub-block. Specifically, the length of the short side of each sub-block is compared with a quantization control size for each region associated with a quantization control depth. In each region, when there is a sub-block of which the length of the short side is larger than or equal to a quantization control size, a quantization parameter is encoded for each of the sub-blocks in the region. When the length of the short side of each sub-block in the region is not larger than or equal to the quantization control size, one quantization parameter is shared among the sub-blocks in the region, and the one quantization parameter is encoded.

Alternatively, when the depth of each target sub-block is less than or equal to a quantization control depth and the length of a longer one of a horizontal side and a vertical side of each target sub-block is larger than or equal to a quantization control size, a quantization parameter may be encoded for each of the sub-blocks. In this case, the size of each sub-block is compared with a quantization control size for each region associated with a quantization control depth. In each region, when there is a sub-block of which the length of the long side is larger than or equal to a quantization control size, a quantization parameter is encoded for each of the sub-blocks in the region. When the length of the long side of each sub-block in the region is not larger than or equal to the quantization control size, one quantization parameter is shared among the sub-blocks in the region, and the one quantization parameter is encoded.

Alternatively, when the depth of each target sub-block is less than or equal to a quantization control depth and the pixel count of each target sub-block is greater than or equal to the pixel count of a quantization control size, a quantization parameter may be encoded for each of the sub-blocks. In this case, the size of each sub-block is compared with a quantization control size for each region associated with a quantization control depth. In each region, when there is a sub-block of which the pixel count is greater than or equal to the pixel count of a quantization control size, a quantization parameter is encoded for each of the sub-blocks in the region. When the pixel count of each sub-block in the region is not greater than or equal to the quantization control size, one quantization parameter is shared among the sub-blocks in the region, and the one quantization parameter is encoded.

Alternatively, the width and height of a quantization control size may be designated and used in combination with a quantization control depth. In this case, the vertical length and horizontal length of each sub-block are respectively compared with the width and height of a quantization control size for each region associated with a quantization control depth. In this case, when there is a sub-block of which both or one of the vertical length and the horizontal length is greater than or equal to the width and height of the quantization control size, a quantization parameter is encoded for each of the sub-blocks in a target region. When there is no sub-block of which both or one of the vertical length and the horizontal length is greater than or equal to the width and height of the quantization control size, a quantization parameter is shared in the region, and one quantization parameter is encoded.

In this way, in cases where rectangular sub-block splitting is used many times, it is possible to realize quantization parameter coding control even in extremely long slender rectangular sub-blocks by using not only a quantization control depth but also a quantization control size.

Figure 18:
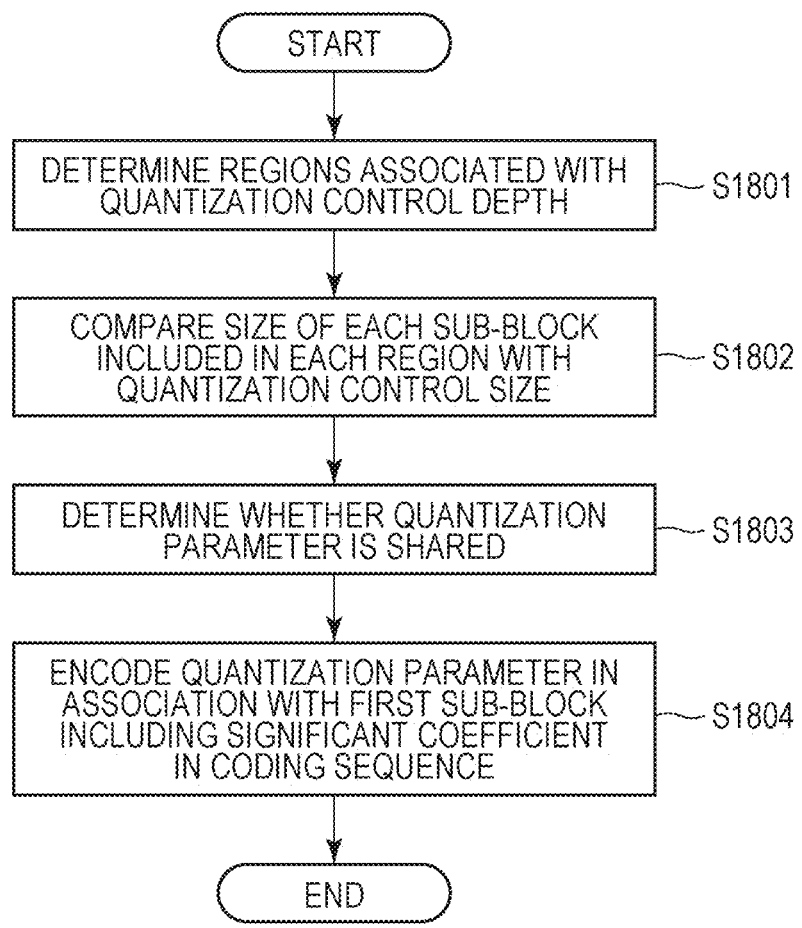
FIG. 18 is a flowchart of a quantization parameter coding process using a quantization control size and a quantization control depth.

FIG. 18 is a flowchart showing a quantization parameter coding process by using both a quantization control size and a quantization control depth.

In step S1801, the transform and quantization section 105 compares a quantization control depth with the depth of splitting of sub-blocks and determines regions having a block depth associated with the quantization control depth.

In step S1802, for each of the regions determined in step S1801, the transform and quantization section 105 compares the size of each of sub-blocks included in the region with a quantization control size.

In step S1803, as a result of comparison in step S1802, the transform and quantization section 105 determines whether one quantization parameter is shared among the sub-blocks in a target region. In accordance with the determination, quantization of each of the sub-blocks in each region is performed by using the quantization parameter associated with the sub-blocks, and residual coefficients of each sub-block are generated.

In step S1804, when one quantization parameter is shared among the sub-blocks in the target region, the coding section 110 encodes a quantization parameter in association with a first sub-block having at least one significant coefficient in the coding sequence. On the other hand, a quantization parameter is not encoded in association with another sub-block. When one quantization parameter is not shared among the sub-blocks in the target region, the coding section 110 encodes a quantization parameter in association with each of the sub-blocks other than sub-blocks including no significant coefficient. The integrated coding section 111 encodes the quantization control size information and the quantization control depth information.

Such a coding process is performed on each of basic blocks.

When a quantization parameter coding process is performed by using both a quantization control size and a quantization control depth, a quantization parameter is more likely to be associated with each of sub-blocks when the long side of each sub-block is compared with the quantization control size. In other words, a manner of making a comparison with a quantization control size by using the long side of each sub-block is more suitable for an object having a long slender shape.

When the type of splitting of sub-blocks is hierarchically continuous, sharing a quantization parameter may be prohibited regardless of the result of comparison between a quantization control size and the size of each sub-block. With this configuration, it is possible to perform quantization of sub-blocks suitable for an object having a long slender shape.

Figure 2:
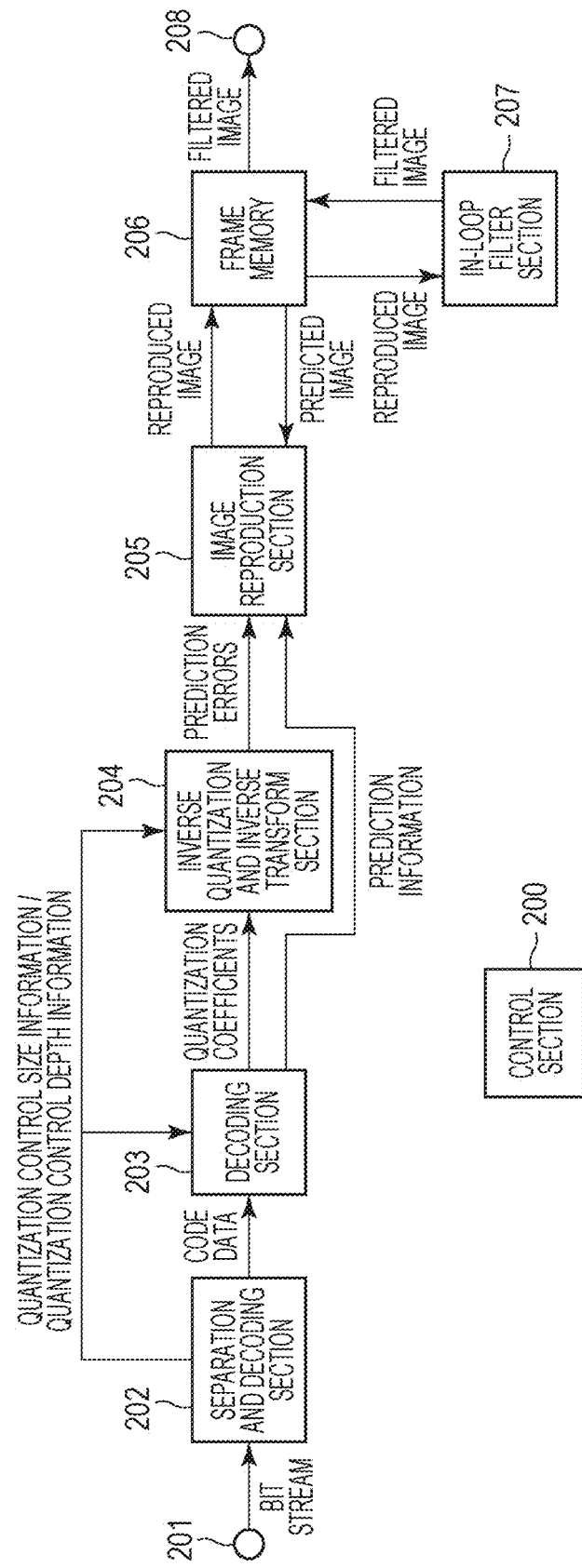
FIG. 2 is a block diagram showing the configuration of an image decoding apparatus in the embodiment.

FIG. 2 is a block diagram showing the configuration of an image decoding apparatus. In the present embodiment, for example, decoding of encoded data generated in the image coding apparatus shown in FIG. 1 will be described.

A terminal 201 is an input terminal from which an encoded bit stream is input.

A separation and decoding section (A separation and decoding unit) 202 separates information on a decoding process and code data on residual coefficients from a bit stream, and decodes code data in the header of the bit stream. In the present embodiment, the separation and decoding section 202 decodes quantization control size information and outputs the quantization control size information to the subsequent stage. The separation and decoding section 202 performs the inverse operation of the integrated coding section 111 shown in FIG. 1.

A decoding section (A decoding unit) 203 acquires residual coefficients and prediction information from code data output from the separation and decoding section 202.

An inverse quantization and inverse transform section (An inverse quantization and inverse transform unit) 204 performs inverse quantization of the residual coefficients input in units of blocks, further applies inverse orthogonal transformation, and acquires prediction errors.

Frame memory 206 is memory that stores reproduced image data of a picture.

An image reproduction section (An image reproduction unit) 205 generates predicted image data by reading the frame memory 206 as needed using input prediction information. The image reproduction section 205 generates reproduced image data from the predicted image data and the prediction errors reproduced by the inverse quantization and inverse transform section 204 and outputs the reproduced image data.

An in-loop filter section (An in-loop filter unit) 207 is. The in-loop filter section 207, as well as the in-loop filter section 109 shown in FIG. 1, applies in-loop filtering, such as deblocking filter, to a reproduced image and outputs the filtered image.

A terminal 208 is an output terminal from which reproduced image data is output to the outside.

An image decoding operation in the image decoding apparatus will be described below. In the present embodiment, a bit stream generated in the present embodiment is decoded.

In FIG. 2, a control section (a control unit) 200 is a processor that controls the overall image decoding apparatus, and a bit stream input from the terminal 201 is input to the separation and decoding section 202. The separation and decoding section 202 separates information on a decoding process and code data on coefficients from the bit stream, and decodes code data in the header of the bit stream. Specifically, the decoding section 202 decodes quantization control size information. In the present embodiment, initially, the quantization control size information from the picture header of the bit stream shown in FIG. 6A is decoded. The thus obtained quantization control size information is output to the decoding section 203 and the inverse quantization and inverse transform section 204. Furthermore, code data in units of blocks of picture data is output to the decoding section 203.

The decoding section 203 decodes code data and acquires residual coefficients, prediction information, and quantization parameters. The residual coefficients and quantization parameters are output to the inverse quantization and inverse transform section 204, and the acquired prediction information is output to the image reproduction section 205.

Here, a process of allocating quantization parameters to sub-blocks in accordance with a quantization control size will be described with reference to FIG. 10. As described above, in each of FIG. 10A to FIG. 10F, the left side shows a block splitting type and a quantization parameter (Qp) used during coding in each sub-block. The diagonally-shaded sub-block represents a sub-block associated with a quantization parameter. A thick-frame rectangle represents a region in which a quantization parameter determined in accordance with a quantization control size and each target sub-block size is shared. A method of making a comparison with a quantization control size is similar to that of the image coding apparatus. For example, as described with reference to FIG. 8 and FIG. 9, a shorter one of a horizontal side and a vertical side of each target sub-block is compared with a quantization control size. The middle view represents whether each sub-block has a significant coefficient. A significant coefficient means a non-zero coefficient among residual coefficients. In other words, having a significant coefficient means that at least one non-zero residual coefficient is present in a sub-block. The arrow shown on the right side in the drawing indicates a sequence of decoding. Among sub-blocks in a quantization parameter coding unit, a quantization parameter is decoded in a first sub-block including a significant coefficient in the decoding sequence. For example, in FIG. 10B, a first sub-block including a significant coefficient in the decoding sequence is a top-right sub-block, so a quantization parameter is decoded for the sub-block. In this case, bottom-left and bottom-right sub-blocks are in a region in which the quantization parameter is shared, and the quantization parameter in the top-right sub-block has been already decoded. In other words, no encoded data of quantization parameters associated with the bottom-left and bottom-right sub-blocks is present in a bit stream, and the quantization parameters associated with the bottom-left and bottom-right sub-blocks are not decoded. In a quantization and inverse quantization process in the bottom-left and bottom-right sub-blocks, QpA that is the same quantization parameter as that of the top-right sub-block is used. Furthermore, no significant coefficient is present in the top-left sub-block, so a quantization process is not performed; however, QpA that is the same quantization parameter as that of the top-right sub-block is used in a process using a quantization parameter, such as deblocking filter. In FIG. 10F, a first sub-block including a significant coefficient in the decoding sequence is a bottom sub-block, so a quantization parameter associated with the sub-block is decoded. No encoded data of quantization parameters associated with top and middle sub-blocks in FIG. 10F is present in a bit stream, and the quantization parameters associated with the top and middle sub-blocks are not decoded. However, in the top and middle sub-blocks in FIG. 10F, as well as the top-left sub-block in FIG. 10B, QpA that is the same quantization parameter as that of the bottom sub-block is used in a process using a quantization parameter, such as deblocking filter. In this way, in sub-blocks in a quantization parameter coding unit determined in accordance with a quantization control size, a quantization parameter is decoded for a first sub-block including a significant coefficient in the decoding sequence.

The inverse quantization and inverse transform section 204 generates orthogonal transform coefficients by performing inverse quantization on input residual coefficients, further applies inverse orthogonal transformation, and reproduces prediction errors. In inverse quantization of each sub-block, inverse quantization is performed by using a common quantization parameter for each region in which a quantization parameter is shared. The acquired prediction information is output to the image reproduction section 205.

The image reproduction section 205 reproduces a predicted image by reading the frame memory 206 as needed using prediction information input from the decoding section 203. The image reproduction section 205 reproduces image data from the predicted image and the prediction errors input from the inverse quantization and inverse transform section 204, inputs the image data to the frame memory 206, and stores the image data in the frame memory 206. The stored image data is used for reference at the time of prediction.

An in-loop filter section (An in-loop filter unit) 207, as well as 109 in FIG. 1, reads out a reproduced image from the frame memory 206 and applies in-loop filtering, such as deblocking filter and sample adaptive offset, to the reproduced image. The filtered image is input to the frame memory 206 again.

A reproduced image stored in the frame memory 206 is finally output to the outside from the terminal 208.

Figure 4:
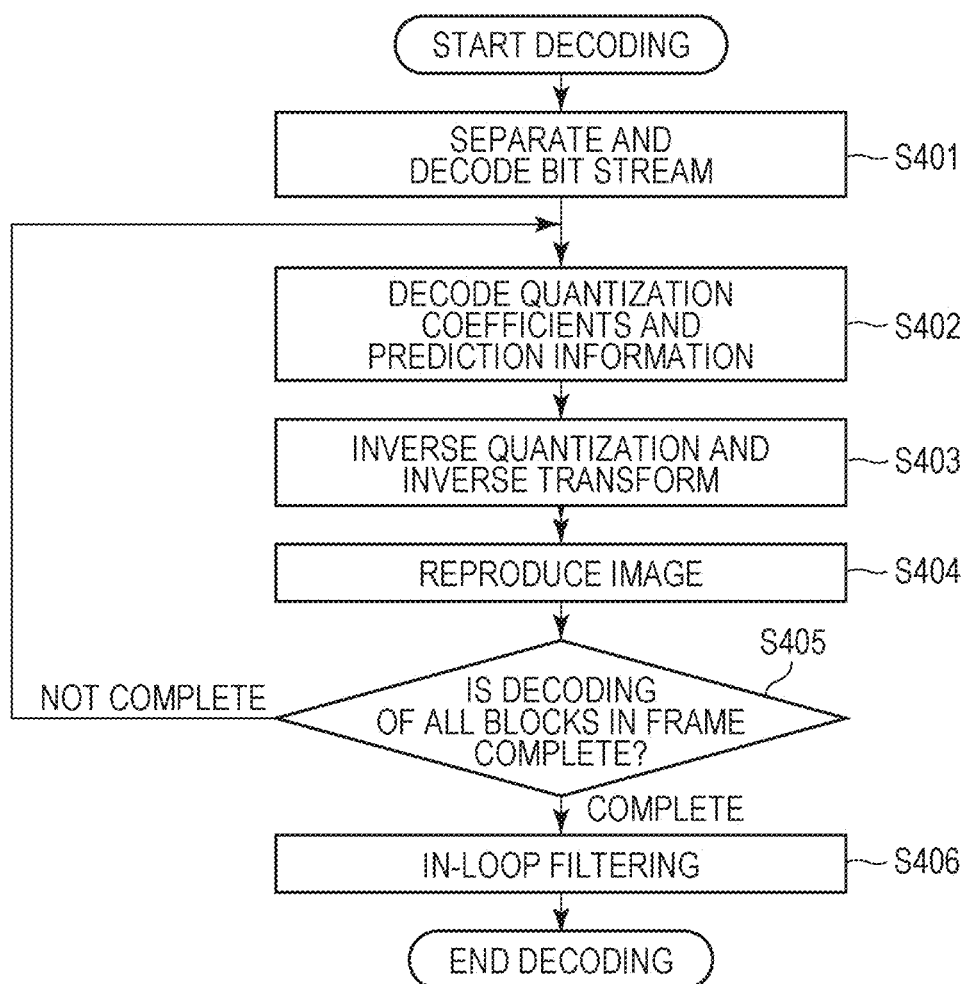
FIG. 4 is a flowchart showing an image decoding process performed in the image decoding apparatus according to the embodiment.

FIG. 4 is a flowchart showing an image decoding process performed in the image decoding apparatus.

Initially, in step S401, the separation and decoding section 202 separates information on a decoding process and code data on coefficients from a bit stream, decodes the code data in the header, and acquires quantization control size information.

In step S402, the decoding section 203 decodes the code data separated in step S401 and acquires block split information, residual coefficients, prediction information, and quantization parameters.

In step S403, the inverse quantization and inverse transform section 204 performs inverse quantization on the residual coefficients in units of sub-blocks, further applies inverse orthogonal transformation, and acquires prediction errors. Specifically, quantization control size information (for example, the length of one side of a square block) is compared with the size (for example, the length of a short side or long side) of each sub-block, determined from the acquired block split information. As a result, a region (sub-blocks) in which a quantization parameter is shared is determined. An inverse quantization process is performed by using quantization parameters respectively allocated to the sub-blocks.

In step S404, the image reproduction section 205 reproduces a predicted image in accordance with the prediction information acquired in step S402. The image reproduction section 205 further reproduces image data from the reproduced predicted image and the prediction errors generated in step S403.

In step S405, the control section 200 of the image decoding apparatus determines whether decoding of all the blocks in a frame is complete, and, when decoding is complete, the process proceeds to step S406; otherwise, the process proceeds to step S402 for the next block.

In step S406, the in-loop filter section 207 applies in-loop filtering to the image data reproduced in step S404, generates the filtered image, and ends the process.

Through the thus configured operation, it is possible to decode a bit stream with the amount of data suppressed by a quantization parameter decoding process using quantization control size information.

In the image decoding apparatus, a bit stream in which quantization control size information is included in the picture header as shown in FIG. 6A is decoded; however, an information coding position is not limited thereto. Alternatively, quantization size information may be encoded in the sequence header of an image as shown in FIG. 6B or may be encoded in another position.

In the present embodiment, a determination is performed by using a shorter one of a horizontal length and a vertical length of each target sub-block for comparison with a quantization control size; however, the present invention is not limited thereto. For example, as shown in FIG. 11, the length of the long side of a horizontal size and a vertical size of each target sub-block may be compared with a quantization control size, and a region in which a quantization parameter is shared may be determined. In FIG. 11, since the long sides of all the sub-blocks are longer than the quantization control size (16), a quantization parameter is encoded for each of the sub-blocks. In this case, for rectangular sub-blocks, rather than reduction in the amount of code of quantization parameters, it is possible to perform a quantization process compatible with a vertically-long or horizontally-long object.

Furthermore, as another embodiment, a region in which a quantization parameter is shared may be determined by comparing the pixel count of each target sub-block with the pixel count of a quantization control size. FIG. 12 shows cases where the pixel count of the size of each target sub-block is compared with the pixel count of a quantization control size. In FIG. 12, the quantization control size is 16×16 pixels, so the pixel count is 256. In the examples of FIG. 12A to FIG. 12F, the pixel count is greater than or equal to 256 pixels in all the sub-blocks. Thus, in the examples of FIG. 12, a quantization parameter is not shared among all the sub-blocks but used one by one, and each quantization parameter is decoded. With this configuration, regardless of the shape of each sub-block, it is possible to realize quantization parameter control based on a pixel count in each sub-block.

In the present embodiment, the description is made on the assumption that the quantization control size is one side of a square block. Alternatively, the quantization control size may be one side of a rectangular block. In this case, the width and height of a quantization control size may be designated. In this case, the vertical length and the horizontal length of each target sub-block may be respectively compared with the width and height of a quantization control size, and, when both or one of the lengths is larger than or equal to the quantization control size, a quantization parameter may be decoded for each sub-block. When a sub-block of which both lengths or one of the lengths is smaller than the quantization control size is present in a basic block to be processed, one quantization parameter to be shared among sub-blocks that satisfy the condition is decoded. With this configuration, it is possible to realize different quantization parameter controls for vertically-long rectangular sub-blocks and horizontally-long rectangular sub-blocks.

In the present embodiment, the reference based on which a quantization parameter is encoded is defined by a spatial size; however, the configuration is not limited thereto. The depth of quantization control (hereinafter, referred to as quantization control depth) indicating the number of times a basic block is split is decoded from a bit stream, and the quantization control depth is compared with the depth of splitting of each target sub-block. A region of sub-blocks, in which a quantization parameter to be decoded is shared may be determined in accordance with this configuration. Here, the depth of each target sub-block will be described with reference to FIG. 13. In FIG. 13, D0 and D1 respectively indicate a depth of 0 and a depth of 1. FIG. 13A shows that a basic block has not been split once and the depth of the sub-block is 0 (D0). FIG. 13B shows that a basic block has been split in four and the depth of each sub-block is 1 (D1). FIG. 13C and FIG. 13D show that a basic block has been split in two and the depth of each sub-block is 1 (D1). FIG. 13E and FIG. 13F show that a basic block has been split in three and the depth of each sub-block is 1 (D1). In this way, the depth of each of sub-blocks into which a basic block has been split once increments one in any of four-section splitting, two-section splitting, and three-section splitting. Next, how a quantization parameter is decoded in accordance with a quantization control depth and the depth of splitting of each target sub-block will be described with reference to FIG. 14. FIG. 14A to FIG. 14E show that the outermost square is a basic block. In each of FIG. 14A to FIG. 14E, the left side shows split sub-blocks, and the right side shows regions in each of which a quantization parameter is shared. D0, D1, D2, D3, or D4 in each block in the drawings indicates the depth of the sub-block. For example, D0 indicates a depth of 0, and D4 indicates a depth of 4. Qp denotes a quantization parameter. FIG. 14A, FIG. 14B, FIG. 14C, FIG. 14D, and FIG. 14E respectively show the cases where the quantization control depths are 0, 1, 2, 3, and 4. In the case of FIG. 14A, that is, when the quantization control depth is 0, a common quantization parameter is decoded in all the sub-blocks in the drawing. The quantization parameter is decoded in a first sub-block including a significant coefficient in the decoding sequence. In this case, the number of quantization parameters to be decoded is one. In the case of FIG. 14B, that is, when the quantization control depth is 1, a common quantization parameter is encoded in units of blocks shown in the right-side view of FIG. 14B. Each of these quantization parameters is associated with a first sub-block including a significant coefficient in the decoding sequence and are decoded. In the case of FIG. 14B, the number of quantization parameters to be decoded is four. In the case of FIG. 14C, that is, when the quantization control depth is 2, a common quantization parameter is encoded in units of blocks shown in the right-side view of FIG. 14C. Each of these quantization parameters is associated with a first sub-block including a significant coefficient in the decoding sequence and are decoded. In this case, the number of quantization parameters to be decoded is 11. In the case of FIG. 14D, that is, when the quantization control depth is 3, a common quantization parameter is encoded in units of blocks shown in the right-side view of FIG. 14D. In this case as well, each quantization parameter is associated with a first sub-block including a significant coefficient in the decoding sequence and is decoded. In the case of FIG. 14D, the number of quantization parameters to be decoded is 23. In the case of FIG. 14E, that is, when the quantization control depth is 4, a common quantization parameter is encoded in units of blocks, that is, for each of the blocks, shown in the right-side view of FIG. 14D. Quantization parameters of sub-blocks including no significant coefficient are not decoded; however, when it is assumed that all the sub-blocks include a significant coefficient, 27 quantization parameters are decoded. Here, a case where a sub-block including no significant coefficient is present in a region in which a quantization parameter is shared will be described with reference to FIG. 15. FIG. 15A, as well as FIG. 14, shows sub-block splitting, and D0, D1, D2, D3, or D4 indicates the depth of splitting of each sub-block. FIG. 15B is an example showing quantization parameter sharing regions determined in accordance with the quantization control depth and the depth of each sub-block as in the case of FIG. 14. FIG. 15 shows the case where the quantization control depth is 2 as an example. When no significant coefficient is present in all the three sub-blocks in a quantization parameter coding unit QpG in FIG. 15, quantization parameters are not decoded in the three sub-blocks. However, for processes using a quantization parameter, such as deblocking filter, the same value as a quantization parameter decoded just before the quantization parameter coding unit in the decoding sequence, that is, QpF, is applied to the three sub-blocks in QpG. In a quantization parameter coding unit in which no significant coefficient is present, a quantization parameter encoded just before in the decoding sequence in processes using a quantization parameter may be used; however, the present invention is not limited thereto. For example, QpD that is a quantization parameter of an upper adjacent quantization parameter coding unit may be used or QpF that is a left adjacent quantization parameter may be used. Alternatively, a value calculated from quantization parameters of a plurality of quantization parameter coding units, such as a mean value, may be used. Alternatively, an initial value of a quantization parameter for a slice may be used. A slice means a unit in which a frame is split, and is made up of at least one or more basic blocks. In this way, the depth of each target sub-block may be compared with a quantization control depth, and, when the depth of each target sub-block is less than or equal to the quantization control depth, a quantization parameter to be shared may be decoded. Since sub-block split information is decoded each time of splitting, it is possible to realize quantization parameter coding control highly compatible with sub-block split information accordingly, with the result that it is possible to decode a bit stream of which the structure of syntax is simplified.

Figure 17:
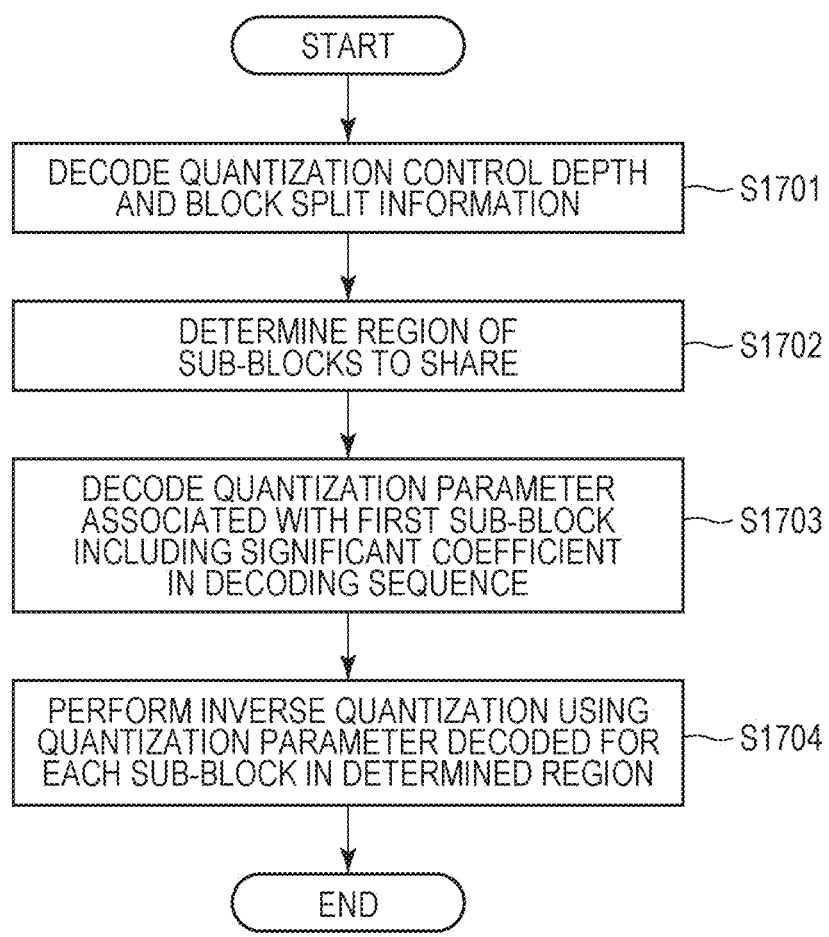
FIG. 17 is a flowchart of a quantization parameter decoding process using a quantization control depth.

FIG. 17 is a flowchart showing a quantization parameter decoding process using a quantization control depth.

In step S1701, the separation and decoding section 202 decodes quantization control size information and information on quantization control depth from a bit stream. The decoding section 203 decodes split information and acquires information on the shape and depth of each sub-block. The inverse quantization and transform section 204 compares the quantization control depth information decoded by the separation and decoding section 202 with the depth of splitting of each sub-block, obtained in accordance with the split information decoded by the decoding section 203.

In step S1702, the inverse quantization and transform section 204 determines a region of sub-blocks having a depth of splitting greater than the quantization control depth as a result of comparison in S1701 as a region in which one quantization parameter is shared.

In step S1703, the inverse quantization and transform section 204 decodes a quantization parameter associated with a sub-block having at least one significant coefficient as a residual coefficient in the decoding sequence among the sub-blocks in the determined region.

In step S1704, the inverse quantization and transform section 204 performs inverse quantization on the sub-blocks in the region determined in step S1702 by using the quantization parameter decoded in step S1703. The process of FIG. 17 is performed on each of basic blocks in a frame.

Furthermore, both a quantization control size and a quantization control depth may be generated and used in combination. In this case, in addition to information on quantization control size, shown in FIG. 6, information on quantization control depth is decoded.

For example, when the depth of each target sub-block is less than or equal to a quantization control depth and the length of a shorter one of a horizontal side and a vertical side of each target sub-block is larger than or equal to a quantization control size, a quantization parameter is decoded for each of the sub-blocks.

Specifically, the length of the short side of each sub-block is compared with a quantization control size for each region associated with a quantization control depth. In each region, when there is a sub-block of which the length of the short side is larger than or equal to a quantization control size, a quantization parameter is decoded for each of the sub-blocks in the region. When the length of the short side of each sub-block in the region is not larger than or equal to the quantization control size, one quantization parameter shared among the sub-blocks in the region is decoded.

Alternatively, when the depth of each target sub-block is less than or equal to a quantization control depth and the length of a longer one of a horizontal side and a vertical side of each target sub-block is larger than or equal to a quantization control size, a quantization parameter may be decoded for each of the sub-blocks. Specifically, the size of each sub-block is compared with a quantization control size for each region associated with a quantization control depth. In each region, when there is a sub-block of which the length of the long side is larger than or equal to a quantization control size, a quantization parameter is decoded for each of the sub-blocks in the region. When the length of the long side of each sub-block in the region is not larger than or equal to the quantization control size, one quantization parameter shared among the sub-blocks in the region is decoded.

Alternatively, when the depth of each target sub-block is less than or equal to a quantization control depth and the pixel count of each target sub-block is greater than or equal to the pixel count of a quantization control size, a quantization parameter may be decoded. In this case, the size of each sub-block is compared with a quantization control size for each region associated with a quantization control depth. In each region, when there is a sub-block of which the pixel count is greater than or equal to the pixel count of a quantization control size, a quantization parameter is decoded for each of the sub-blocks in the region. When the size of each sub-block is not larger than or equal to the quantization control size in each region, one quantization parameter shared among the sub-blocks in the region is decoded.

Alternatively, the width and height of a quantization control size may be designated and used in combination with a quantization control depth. In this case, the vertical length and horizontal length of each sub-block are respectively compared with the width and height of a quantization control size for each region associated with a quantization control depth. In this case, when there is a sub-block of which the length of one or both sides is larger than or equal to the quantization control size, a quantization parameter is decoded for each of the sub-blocks.

Figure 19:
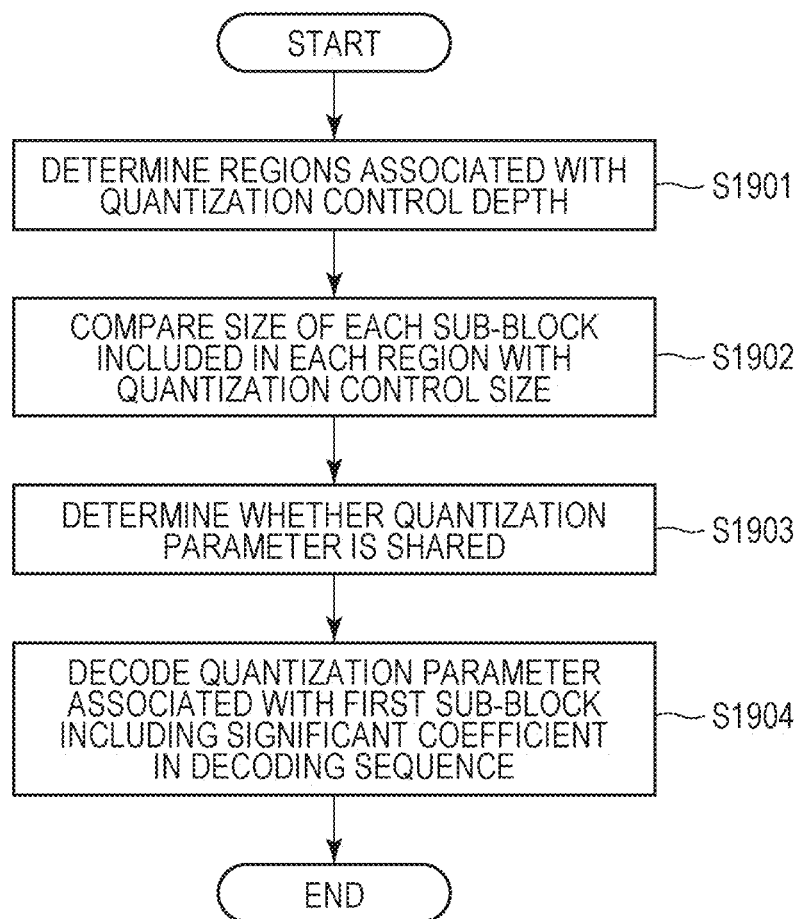
FIG. 19 is a flowchart of a quantization parameter decoding process using a quantization control size and a quantization control depth.

FIG. 19 is a flowchart showing a quantization parameter decoding process by using both a quantization control size and a quantization control depth.

In step S1901, the separation and decoding section 202 decodes information on quantization control size and information on quantization control depth from a bit stream. The decoding section 203 decodes split information and acquires information on the shape and depth of each sub-block. The inverse quantization and inverse transform section 204 compares the quantization control depth with the depth of splitting of each sub-block and determines regions into which sub-blocks are split in accordance with a depth corresponding to the quantization control depth.

In step S1902, for each of the regions determined in step S1901, the inverse quantization and inverse transform section 204 compares the size of each sub-block included in the region with the quantization control size. The size of each sub-block may be obtained from the shape of each sub-block, determined in accordance with the decoded split information.

In step S1903, as a result of comparison in step S1902, the inverse quantization and inverse transform section 204 determines whether one quantization parameter is shared among the sub-blocks in a region to be processed. In accordance with the determination, quantization of each of the sub-blocks in each region is performed by using the quantization parameter associated with the sub-blocks, and residual coefficients of each sub-block are generated.

In step S1904, when one quantization parameter is shared among the sub-blocks in the target region, the decoding section 203 decodes a quantization parameter associated with a first sub-block having at least one significant coefficient in the decoding sequence. There is no encoded data of a quantization parameter associated with another sub-block. When one quantization parameter is not shared among the sub-blocks in the target region, the decoding section 203 decodes a quantization parameter associated with each of the sub-blocks other than sub-blocks including no significant coefficient.

Such a decoding process is performed on each of basic blocks.

When a quantization parameter decoding process is performed by using both a quantization control size and a quantization control depth, a quantization parameter is more likely to be associated with each of sub-blocks when the long side of each sub-block is compared with the quantization control size. In other words, a manner of making a comparison with a quantization control size by using the long side of each sub-block is more suitable for an object having a long slender rectangular shape.

With this configuration, in cases where rectangular sub-block splitting is used many times, it is possible to realize quantization parameter coding control even in extremely long slender rectangular sub-blocks by using not only a quantization control depth but also a quantization control size.

When the type of splitting of sub-blocks is hierarchically continuous, sharing a quantization parameter may be prohibited regardless of the result of comparison between a quantization control size and the size of each sub-block. With this configuration, it is possible to perform quantization of sub-blocks suitable for an object having a long slender shape. The processing sections shown in FIG. 1 and FIG. 2 are described in the above embodiments as components made up of hardware. Alternatively, processes performed by the processing sections shown in these drawings may be configured by a computer program.

Figure 5:
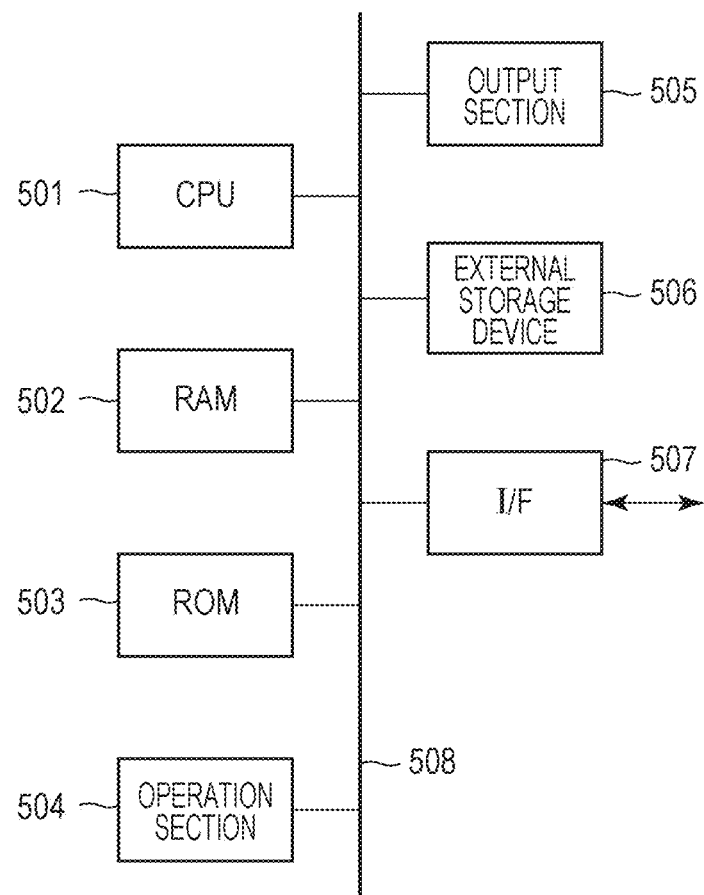
FIG. 5 is a block diagram showing an example of the hardware configuration of a computer applicable to the image coding apparatus and the decoding apparatus of the embodiment.

FIG. 5 is a block diagram showing an example of the hardware configuration of a computer applicable to an apparatus according to the above-described embodiments.

A CPU 501 controls the overall computer by using computer programs and data stored in RAM 502 or ROM 503 and performs the above-described processes performed by an image processing apparatus according to the embodiments. In other words, the CPU 501 functions as the processing sections shown in FIG. 1 and FIG. 2.

The RAM 502 has an area for temporarily storing computer programs and data loaded from an external storage device 506, data acquired from the outside via an I/F (interface) 507, or the like. The RAM 502 also has a work area used at the time when the CPU 501 performs various processes. In other words, the RAM 502 is capable of, for example, allocating frame memory or providing other various areas as needed.

Setup data of the computer, a boot program, and the like are stored in the ROM 503. An operation section (An operation unit) 504 is made up of a keyboard, a mouse, or the like. The operation section 504 allows various instructions to be input to the CPU 501 when a user of the computer operates the operation section 504. A display section (A display unit) 505 displays a processing result by the CPU 501. The display section 505 is made up of, for example, a liquid crystal display.

The external storage device 506 is a mass information storage device typically a hard disk drive. An OS (operating system) and computer programs for causing the CPU 501 to implement the functions of various portions shown in FIG. 1 and FIG. 2 are saved in the external storage device 506. Furthermore, image data to be processed may be saved in the external storage device 506.

The computer programs and data saved in the external storage device 506 are loaded to the RAM 502 and used as targets to be processed by the CPU 501 as needed in accordance with control of the CPU 501. Networks, such as LANs and the Internet, and other devices, such as a projector and a display apparatus, may be connected to the I/F 507. The computer acquires or sends various information via the I/F 507. 508 denotes a bus that connects the above-described sections.

Operations composed of the above-described components and described in the above-described flowcharts are controlled mainly by the CPU 501.

An object of the present invention is also achieved when a system is supplied with a storage medium on which codes of a computer program that implements the above-described functions are recorded, and the system reads out and executes the codes of the computer program. In this case, the codes themselves of the computer program read out from the storage medium implement the functions of the above-described embodiments, and the storage medium in which the codes of the computer program are stored constitutes the present invention. In addition, an operating system (OS), or the like, operating on the computer may perform part or all of actual processes in accordance with instructions of the codes of the computer program, and the above-described functions may be implemented by the processes.

Furthermore, the following mode may be implemented. A computer program code read out from a storage medium is written to a feature expansion card inserted in a computer or memory included in a feature expansion unit connected to the computer. A CPU, or the like, included in the feature expansion card or the feature expansion unit performs part or all of actual processes in accordance with instructions of the codes of the computer program to implement the above-described functions.

When the present invention is applied to the storage medium, codes of a computer program corresponding to the flowcharts described above are stored in the storage medium.

The present invention is used in a coding apparatus and decoding apparatus that encode and decode still images and moving images. Particularly, the present invention is applicable to a coding system and a decoding system that use a quantization process.

With the present invention, it is possible to appropriately encode quantization parameters not only for square sub-blocks but also for rectangular sub-blocks.

The present invention can be implemented by a process of supplying a program for implementing one or more functions of the above-described embodiments to a system or apparatus via a network or storage medium, and causing one or more processors in the computer of the system or apparatus to read out and execute the program. Alternatively, embodiments of the present invention may be implemented by a circuit (for example, ASIC) that implements one or more functions.

Embodiments of the present invention are not limited to the above-described embodiments. Various changes or modifications are applicable without departing from the spirit and scope of the present invention. Therefore, the following claims are attached to show the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image encoding apparatus capable of encoding an image in units of blocks, the image encoding apparatus comprising:
   a first splitting unit configured to split an image into a plurality of coding tree units;
   a second splitting unit configured to split a coding tree unit into a plurality of blocks;
   a comparing unit configured to compare a division value with a threshold for determining a block group to share a quantization parameter, the division value being a value that increases as a number of times the coding tree unit is split increases, the block group being capable of including at least a plurality of blocks of which the division value is greater than the threshold;
   an encoding unit configured to encode data indicating a value of a quantization parameter in accordance with a comparison result obtained by the comparing unit; and
   a filtering unit configured to perform deblocking filtering,
   wherein, in a case where at least any block included in the block group includes a non-zero coefficient, the encoding unit is configured to encode first data indicating a first value of a quantization parameter shared in the block group in association with the block including the non-zero coefficient,
   wherein, in a case where the block group consists of three blocks and the three blocks included in the block group do not include a non-zero coefficient, the encoding unit is configured not to encode the first data for the block group, and the filtering unit is configured to perform deblocking filtering on the three blocks included in the block group by using a second value of a quantization parameter which is a value derived by calculating a mean value of quantization parameters for blocks other than the block group, and
   wherein, the image encoding apparatus further comprises a prediction unit configured to perform prediction on a block split from the coding tree unit.

2. An image decoding apparatus capable of decoding a bitstream encoded by splitting an image into a plurality of coding tree units and splitting a coding tree unit into a plurality of blocks, the image decoding apparatus comprising:
   a comparing unit configured to compare a division value with a threshold for determining a block group to share a quantization parameter, the division value being a value that increases as a number of times the coding tree unit is split increases, the block group being capable of including at least a plurality of blocks of which the division value is greater than the threshold;
   a decoding unit configured to decode data indicating a value of a quantization parameter in accordance with a comparison result obtained by the comparing unit; and
   a filtering unit configured to perform deblocking filtering,
   wherein, in a case where at least any block included in the block group includes a non-zero coefficient, the decoding unit is configured to decode first data indicating a first value of a quantization parameter shared in the block group in processing the block including the non-zero coefficient,
   wherein, in a case where the block group consists of three blocks and the three blocks included in the block group do not include a non-zero coefficient, the decoding unit is configured not to decode the first data for the block group, and the filtering unit is configured to perform deblocking filtering on the three blocks included in the block group by using a second value of a quantization parameter which is a value derived by calculating a mean value of quantization parameters for blocks other than the block group, and
   wherein, the image decoding apparatus further comprises a prediction unit configured to perform prediction on a block split from the coding tree unit.

3. An image encoding method for encoding an image in units of blocks, the image encoding method comprising:
   splitting an image into a plurality of coding tree units;
   splitting a coding tree unit into a plurality of blocks;
   comparing a division value with a threshold for determining a block group to share a quantization parameter, the division value being a value that increases as a number of times the coding tree unit is split increases, the block group being capable of including at least a plurality of blocks of which the division value is greater than the threshold; and
   encoding data indicating a value of a quantization parameter in accordance with a comparison result,
   wherein, in a case where at least any block included in the block group includes a non-zero coefficient, first data indicating a first value of a quantization parameter shared in the block group is encoded in association with the block including the non-zero coefficient,
   wherein, in a case where the block group consists of three blocks and the three blocks included in the block group do not include a non-zero coefficient, the first data for the block group is not encoded, and the image encoding method further comprises performing deblocking filtering on the three blocks included in the block group by using a second value of a quantization parameter which is a value derived by calculating a mean value of quantization parameters for blocks other than the block group, and
   wherein, the image encoding method further comprises performing prediction on a block split from the coding tree unit.

4. An image decoding method for decoding a bitstream encoded by splitting an image into a plurality of coding tree units and splitting a coding tree unit into a plurality of blocks, the image decoding method comprising:
   comparing a division value with a threshold for determining a block group to share a quantization parameter, the division value being a value that increases as a number of times the coding tree unit is split increases, the block group being capable of including at least a plurality of blocks of which the division value is greater than the threshold; and
   decoding data indicating a value of a quantization parameter in accordance with a comparison result;
   wherein, in a case where at least any block included in the block group includes a non-zero coefficient, first data indicating a first value of a quantization parameter shared in the block group is decoded in processing the block including the non-zero coefficient,
   wherein, in a case where the block group consists of three blocks and the three blocks included in the block group do not include a non-zero coefficient, the first data for the block group is not decoded, and the image decoding method further comprises performing deblocking filtering on the three blocks included in the block group by using a second value of a quantization parameter which is a value derived by calculating a mean value of quantization parameters for blocks other than the block group, and wherein, the image decoding method further comprises performing prediction on a block split from the coding tree unit.

5. A non-transitory computer readable medium storing a computer-executable program for causing a computer to perform an image encoding method for encoding an image in units of blocks, the image encoding method comprising:

splitting an image into a plurality of coding tree units;

splitting a coding tree unit into a plurality of blocks;

comparing a division value with a threshold for determining a block group to share a quantization parameter, the division value being a value that increases as a number of times the coding tree unit is split increases, the block group being capable of including at least a plurality of blocks of which the division value is greater than the threshold; and encoding data indicating a value of a quantization parameter in accordance with a comparison result, wherein, in a case where at least any block included in the block group includes a non-zero coefficient, first data indicating a first value of a quantization parameter shared in the block group is encoded in association with the block including the non-zero coefficient, wherein, in a case where the block group consists of three blocks and the three blocks included in the block group do not include a non-zero coefficient, the first data for the block group is not encoded, and the image encoding method further comprises performing deblocking filtering on the three blocks included in the block group by using a second value of a quantization parameter which is a value derived by calculating a mean value of quantization parameters for blocks other than the block group, and wherein, the image encoding method further comprises performing prediction on a block split from the coding tree unit.

6. A non-transitory computer readable medium storing a computer- executable program for causing a computer to perform an image decoding method for decoding a bitstream encoded by splitting an image into a plurality of coding tree units and splitting a coding tree unit into a plurality of blocks, the image decoding method comprising:

comparing a division value with a threshold for determining a block group to share a quantization parameter, the division value being a value that increases as a number of times the coding tree unit is split increases, the block group being capable of including at least a plurality of blocks of which the division value is greater than the threshold; and decoding data indicating a value of a quantization parameter in accordance with a comparison result, wherein, in a case where at least any block included in the block group includes a non-zero coefficient, first data indicating a first value of a quantization parameter shared in the block group is decoded in processing the block including the non-zero coefficient, wherein, in a case where the block group consists of three blocks and the three blocks included in the block group do not include a non-zero coefficient, the first data for the block group is not decoded, and the image decoding method further comprises performing deblocking filtering on the three blocks included in the block group by using a second value of a quantization parameter which is a value derived by calculating a mean value of quantization parameters for blocks other than the block group, and wherein, the image decoding method further comprises performing prediction on a block split from the coding tree unit.

* * * * *